(12) United States Patent
Nozaki et al.

(10) Patent No.: US 7,172,239 B2
(45) Date of Patent: Feb. 6, 2007

(54) SEALING STRUCTURE FOR VEHICLE DOOR

(75) Inventors: Masahiro Nozaki, Aichi-ken (JP); Minoru Tanaka, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 86 days.

(21) Appl. No.: 11/081,839

(22) Filed: Mar. 17, 2005

(65) Prior Publication Data

US 2005/0204634 A1 Sep. 22, 2005

(30) Foreign Application Priority Data

| Mar. 19, 2004 | (JP) | ............................. 2004-079722 |
| Mar. 19, 2004 | (JP) | ............................. 2004-079756 |
| Mar. 19, 2004 | (JP) | ............................. 2004-079790 |
| Jun. 30, 2004 | (JP) | ............................. 2004-192493 |
| Jun. 30, 2004 | (JP) | ............................. 2004-192555 |

(51) Int. Cl.
 *B60J 10/08* (2006.01)
(52) U.S. Cl. ...................................... 296/146.9; 49/441
(58) Field of Classification Search ............. 296/146.9, 296/154, 146.2, 146.3, 201, 135; 49/441, 49/490.1, 498.1, 479.1, 502, 377, 475.1
See application file for complete search history.

(56) References Cited

U.S. PATENT DOCUMENTS

| 4,442,156 | A | * | 4/1984 | Yamaguchi .................. 49/441 |
| 4,448,835 | A | * | 5/1984 | Yamaguchi .................. 428/147 |
| 4,511,526 | A | * | 4/1985 | Yamaguchi .................. 264/129 |
| 4,584,793 | A | * | 4/1986 | Okada et al. ............... 49/495.1 |
| 4,591,204 | A | | 5/1986 | Gallitzendoerfer et al. |
| 4,827,670 | A | | 5/1989 | Kogiso et al. |
| 5,679,434 | A | * | 10/1997 | Ishibashi et al. ............. 296/154 |
| 6,185,869 | B1 | | 2/2001 | Kawai |
| 6,243,989 | B1 | * | 6/2001 | Nozaki ........................ 49/441 |
| 6,340,200 | B1 | * | 1/2002 | Enomoto et al. ...... 296/187.09 |
| 6,389,754 | B2 | * | 5/2002 | Nozaki ........................ 49/441 |
| 6,412,226 | B1 | * | 7/2002 | Nozaki et al. ................ 49/441 |
| 6,493,992 | B2 | | 12/2002 | Goto |
| 6,601,345 | B2 | * | 8/2003 | Nozaki et al. ............. 49/495.1 |
| 6,644,718 | B2 | | 11/2003 | Nozaki |
| 6,668,488 | B2 | * | 12/2003 | Nozaki et al. ............ 296/146.2 |
| 6,679,003 | B2 | * | 1/2004 | Nozaki et al. ................ 49/441 |
| 6,792,718 | B2 | * | 9/2004 | Nozaki ........................ 49/441 |
| 7,055,285 | B2 | * | 6/2006 | Nozaki ........................ 49/440 |
| 2003/0159358 | A1 | | 8/2003 | Nozaki et al. |

(Continued)

FOREIGN PATENT DOCUMENTS

DE    35 38 562 A1    10/1986

(Continued)

*Primary Examiner*—Kiran B. Patel
(74) *Attorney, Agent, or Firm*—Posz Law Group, PLC

(57) ABSTRACT

A sealing structure for sealing a vehicle door against a door opening portion of a vehicle body includes a movable door glass provided outside a door frame of the vehicle door so as to move therealong, a roof moulding attached to the door opening portion of the vehicle body, which extends continuously from a roof thereof, a roof weather strip provided within the roof moulding for sealing an upper edge of the movable door glass which is raised to its closed position, and a door glass weather strip attached outside the door frame for sealing an inside face of a peripheral end of the movable door glass.

12 Claims, 11 Drawing Sheets

U.S. PATENT DOCUMENTS

2005/0003158 A1* 1/2005 Yamasa et al. .............. 428/143
2006/0026903 A1* 2/2006 Nozaki et al. ................ 49/441

FOREIGN PATENT DOCUMENTS

| | | |
|---|---|---|
| DE | 297 12 859 U1 | 5/1998 |
| DE | 695 12 927 T2 | 6/2000 |
| EP | 1 279 542 A1 | 1/2003 |
| FR | 2 684 051 A1 | 5/1993 |
| JP | A-56-005217 | 1/1981 |
| JP | A-62-004415 | 1/1987 |
| JP | U-62-121145 * | 7/1987 |
| JP | A-63-030214 | 2/1988 |
| JP | A-63-212125 | 9/1988 |
| JP | A-01-068219 | 5/1989 |
| JP | A-08-040073 | 2/1996 |
| JP | 3314222 | 6/2002 |

* cited by examiner

SEALING STRUCTURE FOR VEHICLE DOOR

CROSS-REFERENCE TO RELATED APPLICATION

This application is related to and claims priority from Japanese patent applications No. 2004-079756, 2004-079722, 2004-079790, 2004-192493 and 2004-192555 incorporated herein by reference.

BACKGROUND OF THE INVENTION

1. Field of the Invention

The present invention relates to a sealing structure for sealing a vehicle door against a door opening portion of a vehicle body.

2. Description of Related Art

FIG. 1 shows one example of a conventional vehicle door, and FIG. 2 shows one example of a conventional sealing structure between the vehicle door shown in FIG. 1 and a door opening portion of a vehicle body. As shown, a door opening trim weather strip 10 is attached to a flange provided in the door opening portion, and a door weather strip 12 is attached to an outer face of a door frame 14, and when a vehicle door 16 is closed, a protrusion of the door frame 14 contacts a tubular seal portion of the door opening trim weather strip 10, while a tubular seal portion and a seal lip of the door weather strip 12 contacts an outer panel defining the door opening portion, thereby sealing the gap between the door opening portion and the vehicle door 16.

A movable door glass 18 is held with a glass run 20 which is provided within the door frame 14 so as to be raised and lowered along a groove provided in the door frame 14. The glass run 20 has seal lips 22 and 24 for sealing the gap between the movable door glass 18 and the door frame 14. The seal lips 22 and 24 project from side walls of the glass run 20 having a generally U-shaped cross-section towards an interior thereof. The seal lips 22 and 24 hold and seal a peripheral edge of the movable door glass 18 (see U.S. Pat. No. 6,185,869, for example).

With this arrangement, however, the glass run 20, the door frame 14 and a center pillar around the movable door glass 18 degrade the appearance of a side face of the vehicle body. Accordingly, the improvement of design of these members has been demanded. On the other hand, the glass run 20 is interposed between the movable door glass 18 and the door frame 14, or between the movable door glass 18 and the center pillar so that wind noise may be generated in gaps therebetween, which is less preferable.

To solve these problems, it has been proposed to secure a fixed door glass to the center pillar of the vehicle body in flush with the movable door glass, or to dispose the movable door glass outside the door frame so as to move therealong (see Publication of JP utility model application No. Sho 62-4415, FIG. 1, and U.S. Pat. No. 4,591,204, for example). With these proposals, the door frame is located inside the movable door glass and concealed therewith above the door belt line, whereby only the movable door glass appears in the side face of the vehicle body. However, the peripheral edge of the movable door glass cannot be held with the door frame and the glass run.

Accordingly, it is required to hold the peripheral edge of the movable door glass for preventing the bending thereof and preventing the insertion of tools, etc. between the movable door glass and the vehicle body, thereby improving the security of the vehicle. In addition, it is required to securely seal the gap between the peripheral edge of the movable door glass and the vehicle body for preventing the generation of wind noise, etc.

On the other hand, the movable door glass readily vibrates along a vertical part of the door frame, and consequently, the movable door glass may not be smoothly raised or lowered. To solve this problem, a guide groove is provided in the door frame so as to guide and hold the movable door glass. In the sealing structures of the above-described prior art, however, the glass run cannot be provided inside the door frame, whereby it is difficult to seal the gap between the vertical part of the door frame and a side edge of the movable door glass. Therefore, it is also required to guide and seal the movable door glass.

A front door and a rear door may be provided with both the movable door glass and the fixed door glass secured to the door frame. With respect to the movable door glass, it has been tried to provide a roof moulding in the door opening portion for holding an upper edge of the movable door glass raised using a door glass slightly moving system. On the other hand, with respect to the fixed door glass, it is required to provide a space between the roof moulding and a peripheral edge of the fixed door glass upon opening and closing of the vehicle door, and consequently required to seal the above-described space between the roof moulding and fixed door glass fixed door glass securely.

Thus, the sealing arrangement for the movable door glass differs from that for the fixed door glass. Therefore, when the vehicle door is closed, it is required to provide a seal between an upper edge of the movable door glass and the door opening portion and between a peripheral edge of the fixed door glass and the door opening portion, respectively.

In another conventional sealing structure, as shown in FIG. 3, a roof moulding 26 is attached to a door opening portion 28 of a vehicle body along a vehicle roof, and a door glass weather strip 30 is attached within the roof moulding 26. With this arrangement, upon closing of the vehicle door 16, an upper edge of the door glass 18 passes below the roof moulding 26, and when the vehicle door 16 is closed completely, the door glass 18 is slightly raised with a door glass slightly moving system, and the upper edge of the door glass 18 is inserted in the door glass weather strip 30. As a result, the upper edge of the door glass 18 is held without bending, and is sealed with a tubular seal portion 32 of the door glass weather strip 30 (see Publication of unexamined JP patent application No. Hei 8-40073, FIG. 1, for example).

A door mirror base 34 is secured to a front end of the vehicle door 16 above the door belt line. The door mirror base 34 is fixed without moving so that a predetermined space is provided between an upper edge of the door mirror base 34 and the roof moulding 26 when the vehicle door 16 is closed. And in order to seal this space, the tubular seal portion 32 of the door glass weather strip 30 is protruded downwardly in the area corresponding to the upper edge of the door mirror base 34, and when the vehicle door 16 is closed, the upper edge of the door mirror base 34 contacts the protruding part of the tubular seal portion 32 to effect a seal therebetween.

In this case, however, the protruding tubular seal portion 32 of the door glass weather strip 30 is exposed from the roof moulding 26 to degrade the appearance therearound. In addition, sufficient sealing properties are not effected between the movable door glass 18 and the door glass weather strip 30 around an upper corner of the door mirror base 34.

The door mirror base 34 may be further provided with a groove along a rear vertical side thereof, and when the movable door glass 18 is raised and lowered, a front edge thereof moves along this groove. In order to ensure a good seal between the movable door glass 18 and the door glass weather strip 30 around the upper corner of the door mirror base 34, an upper front corner of the movable door glass 18 has an upwardly projecting arc-shaped configuration corresponding to a curved area of the tubular seal portion 32 between an unprotruding area and a downwardly protruding area. When the vehicle door 16 is closed, the movable door glass 18 is slightly raised for placing it inside the roof moulding 26. At this time, where the movable door glass 18 vibrates or the assembling position thereof scatters, a gap may be formed between the upper front corner of the movable door glass 18 and facing upper corner of the door mirror base 34, or they may contact each other to cause wear therein. As a result, the sealing properties between the upper front corner of the movable door glass 18 and the facing upper corner of the door mirror base 34 may be lowered.

SUMMARY OF THE INVENTION

Accordingly, it is an object of the present invention to provide a sealing structure for a vehicle door, which enables an upper part of the vehicle door above a door belt line to be composed of a door glass over an approximately entire face thereof, and enables an upper edge of a movable door glass which is raised to its closed position to be held securely when the vehicle door is closed.

It is another object of the present invention to provide a sealing structure capable of securely sealing a movable door glass against a vertical part of a door frame.

It is still another object of the present invention to provide a sealing structure capable of securely sealing upper edges of both a movable door glass and a fixed door glass against a door opening portion.

It is a further object of the present invention to provide a sealing structure capable of improving the sealing properties in a border area between a movable door glass and a door mirror base against a facing door glass weather strip, and effecting a good appearance around the border area.

The sealing structure in accordance with the present invention includes a vehicle door having a door glass which is provided outside a door frame so as to move therealong, a roof moulding provided in a door opening portion of a vehicle body, which extends continuously from a roof thereof, a roof weather strip provided within the roof moulding for sealing an upper edge of the movable door glass which is raised to its closed position, and a door glass weather strip provided outside the door frame for sealing an inside face of a peripheral end of the movable door glass, whereby when the movable door glass is raised to its closed position, the upper edge of the movable door glass is held and sealed within the roof moulding, and the peripheral end of the movable door glass is sealed with the door glass weather strip.

With this arrangement, when the vehicle door is closed, the upper edge of the movable door glass which is raised to its closed position can be held with the roof moulding provided in the door opening portion of the vehicle body. As a result, vibrations of the upper edge of the movable door glass can be prevented, and the upper edge of the movable door glass can be prevented from deflecting outwardly so that any foreign matter can be prevented from being inserted between the upper edge of the movable door glass and the vehicle body. A side wall of the roof moulding has a width much less than that of a side wall of the door frame, and appears integral with the roof of the vehicle body so as not to show outstanding appearance in the side face of the vehicle body. Only a movable door glass can appear in an upper part of the vehicle door.

In addition, since the roof weather strip is provided within the roof moulding for sealing the upper edge of the movable door glass when the vehicle door is closed, the upper edge of the movable door glass can be held with the roof weather strip, whereby rainwater, dust, etc. can be prevented from intruding via the gap between the movable door glass and the roof of the vehicle body. The roof weather strip is seated within the roof moulding and is not exposed so that it is not outstanding when seeing from an outside of the vehicle body.

Since the door glass weather strip for sealing an inside face of a peripheral end of the movable door glass is provided outside the door frame, the door glass weather strip is provided inside the movable door glass. In the upper part of the vehicle door above the door belt line, only the movable door glass appears so that preferable designing properties of the vehicle door can be obtained. In addition, when the movable door glass is raised to its closed position, rainwater, dust, noise, etc. which intrude via the roof weather strip can be surely sealed, and the door glass weather strip contacts the inside face of the movable door glass, thereby sealing the peripheral end of the movable door glass.

In another aspect of the present invention, the sealing structure includes a movable door glass provided in the vehicle doory so as move therealong, a roof moulding provided in a door opening portion of a vehicle body, which extends continuously from a roof thereof, and a door glass weather strip provided within the roof moulding for sealing an upper edge of the movable door glass which is raised to its closed position such that when the vehicle door is opened, the upper edge of the movable door glass is slightly lowered away from the roof moulding, while the vehicle door is open, the upper edge of the movable door glass is held at the slightly lowered position, and as the vehicle door is closed, the upper edge of the movable door glass is slightly raised again and enters the roof moulding. The door glass weather strip includes a base portion for attachment to the roof moulding and a sealing portion for sealing the upper edge of the movable door glass when the vehicle door is closed. A corner piece is further attached in a front corner of the vehicle door along a door belt line. The sealing portion of the door glass weather strip protrudes downwardly in the area adapted to contact an upper edge of the corner piece when the vehicle door is closed, as compared with the area adapted to contact the upper edge of the movable door glass, and in the vicinity of a border between the area adapted to contact the upper edge of the movable door glass and the area adapted to contact the upper edge of the corner piece, the sealing portion of the door glass weather strip integrally continues and gradually protrudes downwardly.

With this another aspect, since the roof moulding is provided in the door opening portion of the vehicle body, which is continuous with the roof of the vehicle body, when the vehicle door is closed, the upper edge of the movable door glass in its closed position can be held with the roof moulding, whereby the upper edge of the movable door glass can be prevented from deflecting outwardly.

When the vehicle door is opened, the upper edge of the movable door glass is slightly lowered away from the roof moulding with a door glass slightly moving means, and while the vehicle door is open, the upper edge of the movable door glass is held at its slightly lowered position. When the vehicle door is closed, the upper edge of the movable door glass is slightly raised again with the door glass slightly moving means and enters the roof moulding, whereby the movable door glass is seated and held with the roof moulding. Therefore, upon opening of the vehicle door, the upper edge of the movable door glass comes off the roof moulding and the door glass weather strip without any special operation by drivers. As a result, the vehicle door can be opened outwardly. And, since just after closing of the vehicle door, the movable door glass is slightly raised and the upper edge of the movable door glass is seated within the roof moulding, the door glass is prevented from vibrating and being drawn outwardly even when a vehicle is running.

Since the door glass weather strip for sealing the upper edge of the movable door glass is attached to the roof moulding, the door glass weather strip can hold and seal the upper edge of the movable door glass. Consequently, rainwater, dust, etc. can be prevented from intruding via the gap between the movable door glass and the roof of the vehicle body. In addition, since the door glass weather strip is placed within the roof moulding, the sealing portion of the door glass weather strip is not exposed from the roof moulding even when the movable door glass rises and contacts the door glass weather strip, thereby effecting a good appearance around the movable door glass.

The door glass weather strip includes a base portion for attachment to the roof moulding and a sealing portion for sealing the peripheral edge of the movable door glass. When the vehicle door is closed, the movable door glass is raised and the peripheral edge of the movable door glass contacts the sealing portion to seal the peripheral edge of the movable door glass.

The corner piece is attached to the front corner of the vehicle door along the door belt line. The sealing portion of the door glass weather strip protrudes downwardly in the area adapted to contact the upper edge of the corner piece when the vehicle door is closed, as compared with the area adapted to contact the upper edge of the door glass, and in the vicinity of the border between the area adapted to contact the upper edge of the door glass and the area adapted to contact the upper edge of the corner piece, the sealing portion of the door glass weather strip integrally continues, and gradually protrudes downwardly. With this arrangement, in the vicinity of the border between the movable door glass and the corner piece, the sealing portion can securely contact both the upper edges of the movable door glass and the corner piece. In addition, since the sealing portion gradually protrudes downwardly such that the width thereof gradually enlarges, the sealing portion can effect a seal even where the attaching positions of the movable door glass, etc. scatter.

As described above, in accordance with the present invention, in the upper part of the vehicle door above the door belt line, the movable door glass can cover the approximately entire face thereof. Accordingly, the excellent appearance of the side face of the vehicle body is effected. And when the vehicle door is closed, the upper edge of the movable door glass is held with the roof moulding, thereby preventing vibrations of the movable door glass. In addition, the gap between the upper edge of the movable door glass and the vehicle body can be sealed securely to prevent the generation of wind noise.

Furthermore, In accordance with the present invention, when the vehicle door is closed, side edges of the movable door glass can be securely sealed.

And in accordance with the present invention, the corner piece is attached to the front corner of the vehicle door along the door belt line, and the sealing portion of the door glass weather strip protrudes downwardly in the area adapted to contact the upper edge of the corner piece when the vehicle door is closed, as compared with the area adapted to contact the upper edge of the movable door glass. With this arrangement, the upper edge of the corner piece contacts the sealing portion of the door glass weather strip, thereby sealing the gap between the corner piece and the door opening portion.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, several embodiments in accordance with the present invention will be explained with reference to the appended drawings.

Figure 1:
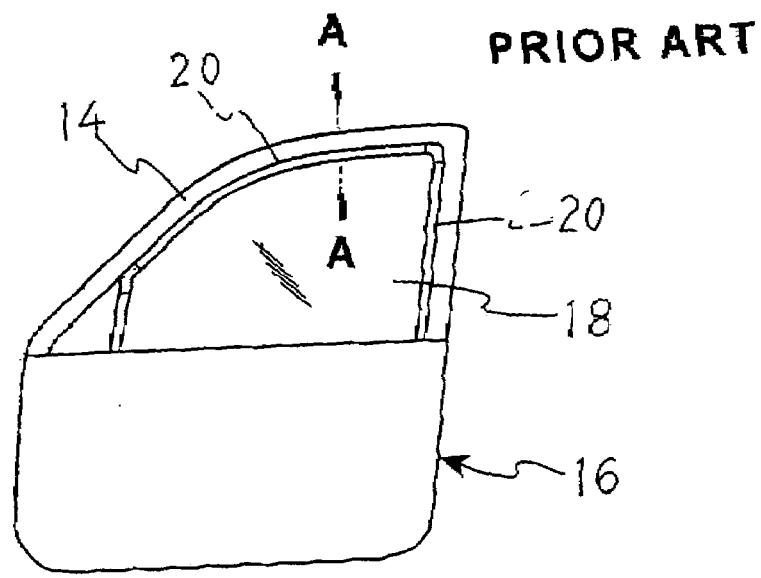
FIG. 1 is a front view of a conventional vehicle door.
Figure 2:
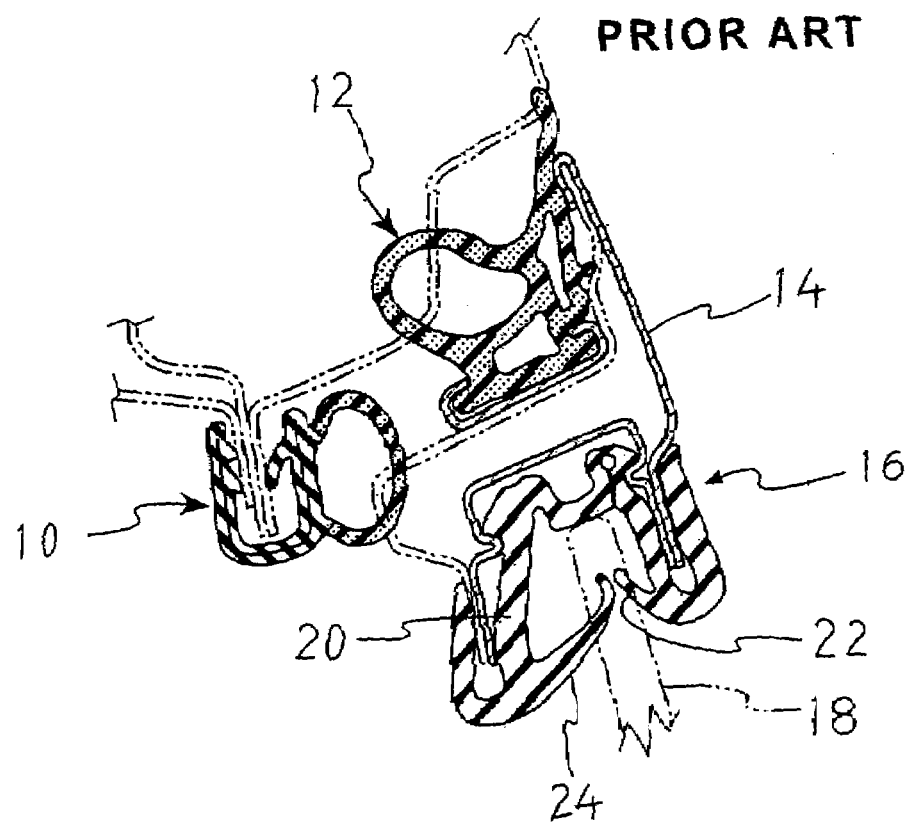
FIG. 2 is a cross-sectional view of a conventional sealing structure, which is taken along the line A—A of FIG. 1.
Figure 3:
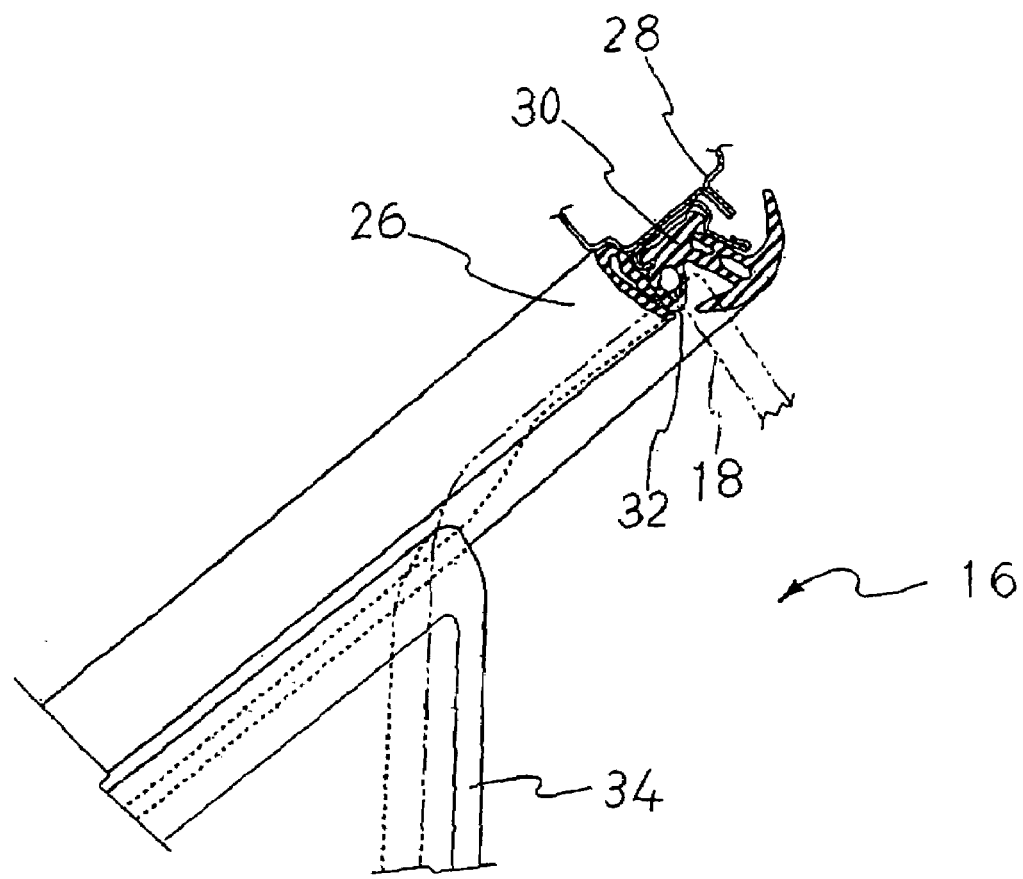
FIG. 3 is a perspective view illustrating the contacting state of upper edges of a conventional door mirror base and a conventional movable door glass against a conventional door glass weather strip.
Figure 4:
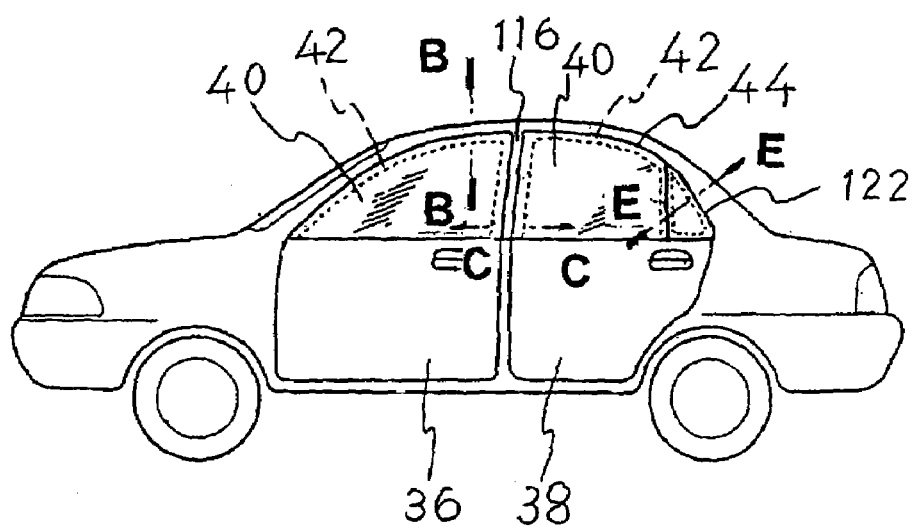
FIG. 4 is a side view of a motor vehicle provided with a sealing structure in accordance with the present invention.
Figure 5:
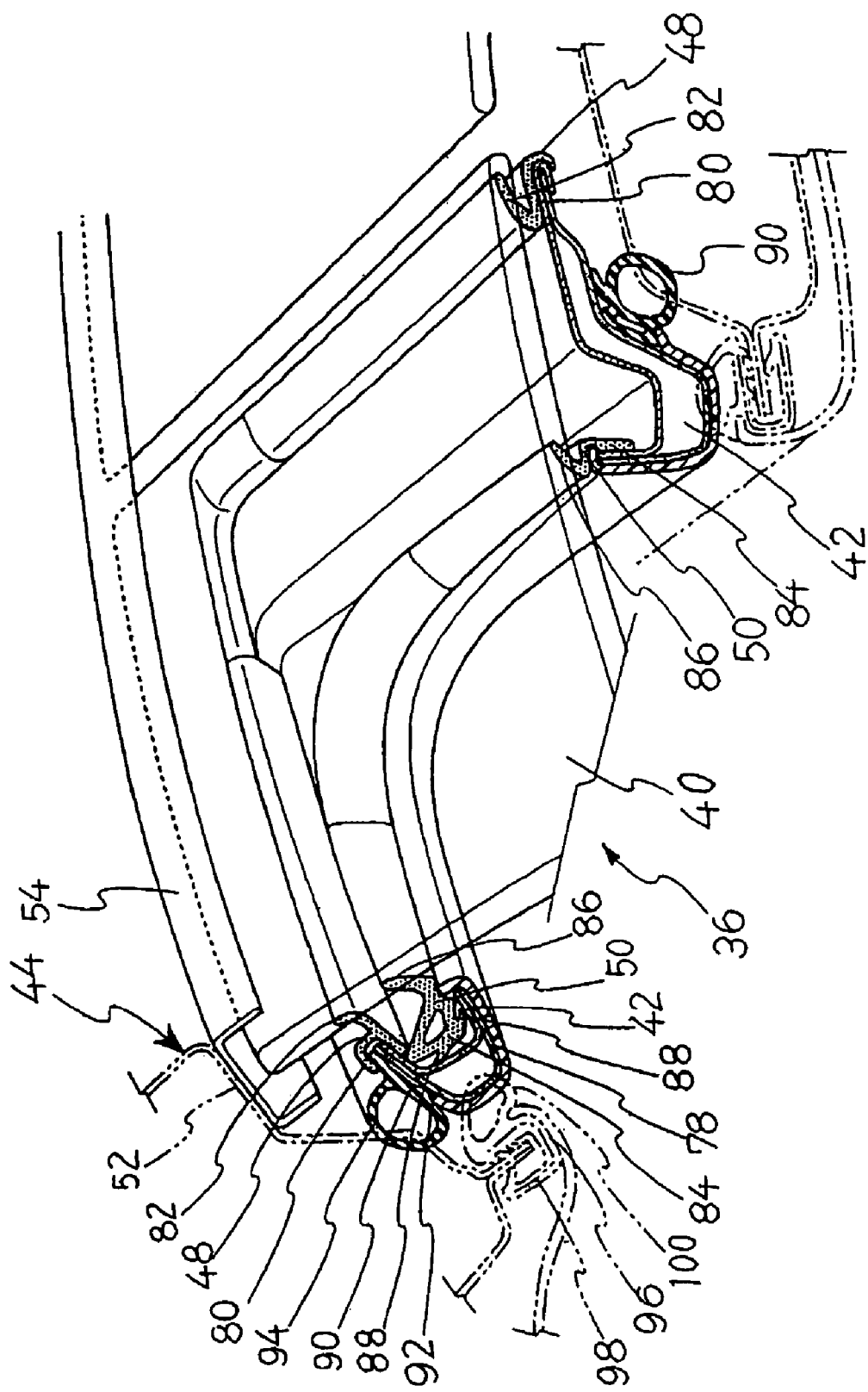
FIG. 5 is a partially cut away perspective view illustrating an upper rear corner of a front door in one embodiment of the sealing structure in accordance with the present invention.
Figure 6:
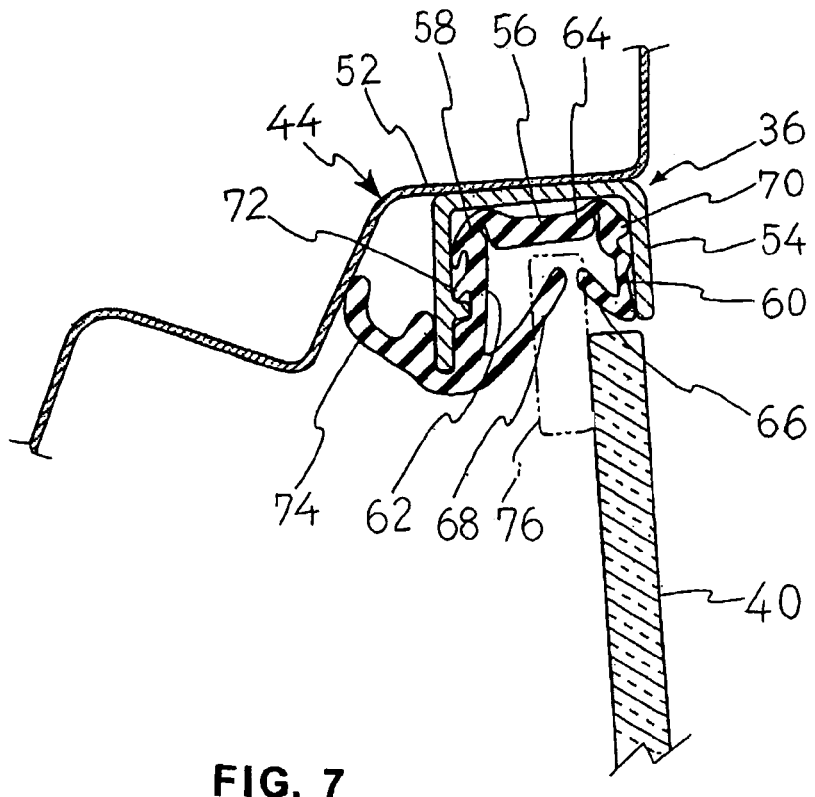
FIG. 6 is a cross-sectional view of a roof weather strip which is attached to a roof moulding in one embodiment of the sealing structure in accordance with the present invention, which is taken along the line B—B of FIG. 4.

FIG. 4 through FIG. 6 illustrate a first embodiment of the present invention. FIG. 4 is a side view of a motor vehicle. As shown, movable door glasses 40 are mounted in a front door 36 and a rear door 38 over approximately entire faces of their upper parts above a door belt line. The movable door glass 40 is located outside a door frame 42 so that the door frame 42 is not directly seen from the outside of the vehicle body. When seen from the outside of the vehicle body in oblique directions, the interior of the movable door glass 40 is difficult to see due to the light reflection by the movable door glass 40, and merely the movable door glass 40 is seen. Therefore, the upper part of the vehicle door 36 or 38 above the door belt line appears to be composed of only the movable door glass 40 approximately entirely, and a fine appearance of the side face of the vehicle body can be obtained.

FIG. 5 is a partially cut-away perspective view of an upper rear corner of the front door 36, and illustrates a sealing structure for sealing the gap between an upper edge of the front door 36 and a door opening portion 44 near a roof of the vehicle body. A roof weather strip 56 (FIG. 6) is not shown.

The door frame 42 includes an upper part for facing the door opening portion, and two vertical parts extending from a front end and a rear end of the upper part vertically. A first door glass weather strip 48 and a second door glass weather strip 50 are attached to the vertical parts of the door frame 42. And a guide groove is provided in a rear vertical part of the door frame 42.

In the door opening portion 44, an outer roof panel bends inwardly and defines a flat face 52 for contacting upper edges of the front door 36 and the rear door 38. A roof moulding 54 having a generally U-shaped cross-section is secured to the flat face 52 continuously from the position facing a front end of the front door 36 to the position facing a rear end of the rear door 38.

FIG. 6 is a cross-sectional view taken along line B—B of FIG. 4, and illustrates the attaching state of the roof moulding 54 and the roof weather strip 56, when the movable door glass 40 is closed.

As shown, the roof weather strip 56 is attached within the roof moulding 54 having a generally U-shaped cross-section. The roof weather strip 56 has a main body 58 with a generally U-shaped cross-section, which includes side walls 60 and 62 and a bottom wall 64. Seal lips 66 and 68 obliquely project from ends of the side walsl 60 and 62 to the interior of the main body 58, respectively.

Holding lips 70 and 72 project outwardly from the side walls 60 and 62 so as to engage with projections provided in side walls of the roof moulding 54, whereby the roof weather strip 56 is held by the roof moulding 54. A cover lip 74 protrudes from an open end of the side wall 62 inwardly and contacts the door opening portion 44 so as to cover the end of the side wall 62 and a space between the side wall 62 and the door opening portion 44.

The roof weather strip 56 thus arranged is formed of a non-foamed rubber, soft synthetic resin, thermoplastic elastomer, etc. by extrusion, and is attached to the roof moulding 54 over the entire length thereof from the position facing the front end of the front door 36 to the position facing the rear end of the rear door 38.

When the movable door glass 40 is raised to its uppermost position with the front door 36, for example, closed, the upper edge of the movable door glass 40 is inserted in the interior of the roof moulding 54, and held by the roof weather strip 56.

Upon opening of the front door 36, the movable door glass 40 is slightly lowered from the above-described uppermost position to the position lower than ends of the side walls of the roof moulding 54 with a door glass slightly moving system, and is stopped at its slightly lowered position. In this state, the front door 36 is opened. Therefore, the upper edge of the movable door glass 40 does not interfere with the ends of the side walls of the roof moulding 54 so that the front door 36 can be opened smoothly.

And while the front door 36 is opened, the movable door glass 40 is held at its slightly lowered position.

Next, upon closing of the front door 36, the upper edge of the movable door glass 40 is located at the position slightly lower than the above-described uppermost position, and lower than the ends of the side walls of the roof moulding 54 such that the movable door glass 40 does not interfere with the side walls of the roof moulding 54. And when the front door 36 is closed completely, the upper edge of the movable door glass 40 is positioned under about a center of the interior of the roof moulding 54. And immediately, the movable door glass 40 is automatically raised slightly with the door glass slightly movable system so that the upper edge of the movable door glass 40 is inserted in the interior of the main body 58 of the roof weather strip 56 which is held by the roof moulding 54.

Consequently, the upper edge of the movable door glass 40 is held again with the roof moulding 54 via the roof weather strip 56. Therefore, the movable door glass 40 is prevented from vibrating and deflecting outwardly. In addition, any foreign material, etc. is prevented from being inserted between the movable door glass 40 and the door opening portion 44. And the seal lips 66 and 68 of the roof weather strip 56 contact and seal outside and inside faces of the upper edge of the movable door glass 40.

Furthermore, as illustrated in FIG. 6, an upper door glass 76 is provided in the inside face of the movable door glass 40 along the upper edge thereof to define an inwardly depressed part. The upper door glass 76 projects upwardly by the height capable of being inserted in the interior of the main body 58 of the roof weather strip 56. This upper door glass 76 can be provided by bonding a belt-shaped glass plate to the inside face of the movable door glass 40.

Alternatively, the upper door glass 76 may be provided by bending the movable door glass 40 upon forming thereof.

With this arrangement, when the front door 36 is closed and the movable door glass 40 is raised to its uppermost position, or when the front door 36 is closed with the movable door glass 40 closed (namely, located at its uppermost position), the upper door glass 76 is seated in the interior of the main body 58 of the roof moulding 54, and the movable door glass 40 defines an outside face which is flush with the outside face of the roof moulding 54. Accordingly, when the front door 36 is closed, there does not appear any level difference between the movable door glass 40 and the roof moulding 54, thereby improving the appearance around the movable door glass 40, and enabling air to flow smoothly along the side face of the vehicle body, thereby generating no wind noise, etc.

As shown in FIG. 5, the door frame 42 is provided around the inside face of the movable door glass 40, and two door glass weather strips 48 and 50 which are attached to the door frame 42 support the movable door glass 40. A door channel 78 is provided along the upper part of the door frame 42. The door channel 78 has a generally U-shaped cross-section. The first door glass weather strip 48 is attached to an open end of an outer side wall of the door channel 78, and the second door glass weather strip 50 is attached in the interior of the door channel 78.

The first door glass weather strip 48 has a base portion 80 and a seal lip 82. The base portion 80 has a generally U-shaped cross-section, and the open end of the outer side wall of the door channel 78 is inserted in the interior of the base portion 80, whereby the first door glass weather strip 48 is attached to the door frame 42. The seal lip 82 projects outwardly from the base portion 80, and a projecting end of the seal lip 82 contacts the inside face of the movable door glass 40 to prevent rainwater, dust, noise, etc. from intruding into a vehicle compartment.

The second door glass weather strip 50 has a base portion 84 and a seal lip 86, similarly to the first door glass weather strip 48. The base portion 84 has a generally trapezoidal cross-section having a space therein. Projections 88 are provided in a bottom of the base portion 84 for contacting facing side face and bottom face of the door channel 78. These projections 88 serve to attach the second door glass weather strip 50 to the door channel 78, and seal the second door glass weather strip 50 against the door channel 78. The base portion 84 is inserted in the interior of the door channel 78 and both side edges of the base portion 84 contact facing faces of the door frame 42 so as to be attached to the door frame 42.

The seal lip 86 projects outwardly from the base portion 84, and a projecting end of the seal lip 86 contacts the inside face of the movable door glass 40 in the position lower than the contacting position of the seal lip 82 of the first door glass weather strip 48 to prevent rainwater, dust, noise, etc. from intruding into the vehicle compartment.

These two seal lips 82 and 86 contact the inside face of the movable door glass 40 flexibly with the rising and lowering of the movable door glass 40, thereby effecting a double seal between the movable door glass 40 and the door frame 42.

The first door glass weather strip 48 and the second door glass weather strip 50 are composed of a non-foamed rubber, soft synthetic resin, thermoplastic elastomer, etc. and are formed by extrusion. The base portions 80 and 84 and the seal lips 82 and 86 are composed of a non-foamed material. The seal lips 82 and 86 may be composed of a sponge material.

A door weather strip 90 is attached to an outer face of the door frame 42 to provide a seal between the door frame 42 and the door opening portion 44.

The door weather strip 90 has a base portion 92 and a tubular seal portion 94. The base portion 92 has a plate-shaped configuration, and is secured to the outer face of the door frame 42 with a double sided adhesive tape, clips, etc. The tubular seal portion 94 is provided on an upper face of the base portion 92 integrally therewith. When the front door 36 is closed, the tubular seal portion 94 contacts a facing door opening portion 44 to provide a seal between the front door 36 and the door opening portion 44. The tubular seal portion 94 may be replaced with a lip-shaped seal portion.

A door opening trim weather strip 96 is attached to a flange which is formed by welding end edges of the outer panel and an inner panel defining the door opening portion 44.

The door opening trim weather strip 96 has a base portion 98 and a tubular seal portion 100. The base portion 98 has a generally U-shaped cross-section, and holding lips are provided in inner faces of side walls thereof. The flange of the door opening portion 44 is inserted in the interior of the base portion 98, and held with the holding lips, thereby attaching the door opening trim weather strip 50 to the door opening portion 44.

The tubular seal portion 100 is provided on an outer face of the base portion 98 integrally therewith. When the front door 36 is closed, the tubular seal portion 100 contacts and seals a facing protruding face of the door frame 42.

The door weather strip 90 and the door opening trim weather strip 96 are composed of a non-foamed rubber, soft synthetic resin, thermoplastic elastomer, etc. and are formed by extrusion. The base portions 92 and 98 are composed of a non-foamed material. The tubular seal portions 94 and 100 are composed of a sponge material, but may be replaced with lip-shaped seal portions composed of a non-foamed material.

In this manner, the tubular seal portion 94 of the door weather strip 90 and the tubular seal portion 100 of the door opening trim weather strip 96 can provide a double seal between the front door 36 and the door opening portion 44.

Along the vertical part of the door frame 42, the first door glass weather strip 48 and the second door glass weather strip 50 extend downwardly to seal a vertical end of the movable door glass 40.

The first door glass weather strip 48 is attached by bonding the base portion 80 to a side edge of the door frame 42 with a double-sided adhesive tape and clips. The seal lip 82 contacts a side end of the movable door glass 40. The base portion 84 of the second door glass weather strip 50 is attached along a side wall of the door frame 42, and the seal lip 86 contacts and seals the movable door glass 40 in the position slightly inwardly of the side edge thereof.

The present embodiment has been explained with reference to the front door 36. The upper part of the rear door 38 can be sealed with a similar arrangement to that of the front door 36. The roof moulding 54 and the roof weather strip 56 are continuously provided so as to face both the front door 36 and the rear door 38. In the rear door 38, a door frame is provided around an inside face of the movable door glass 40, and a first door glass weather strip and a second door glass weather strip provided in the door frame contact and seal the inside face of the movable door glass 40, similarly to the case of the front door 36. In addition, a door weather strip is attached to the door frame, and a door opening trim weather strip is attached to the flange of the door opening portion 44 to seal the gap between the rear door 38 and the door opening portion 44.

Figure 7:
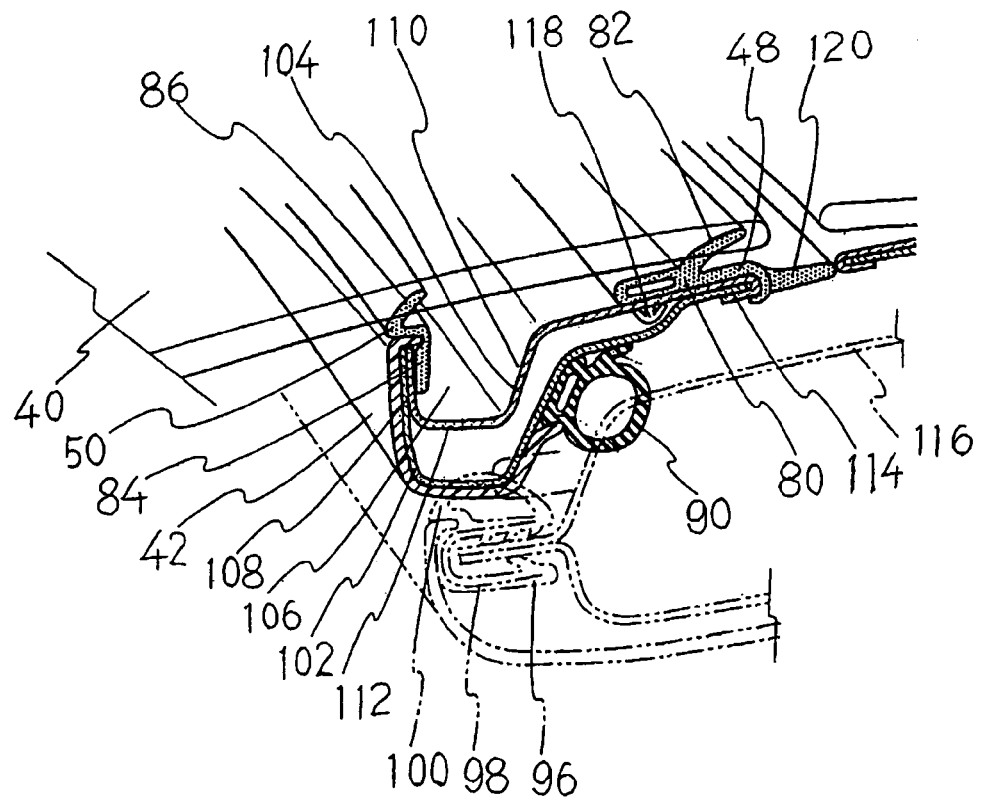
FIG. 7 is a cross-sectional view of one embodiment of the sealing structure in accordance with the present invention, which is taken along the line C—C of FIG. 4.

FIG. 7 shows a modification of a door glass weather stirp for sealing the side end of the movable door glass, and is a cross-sectional view taken along the line C—C of FIG. 4. As shown, the door frame 42 includes an inner panel 102 and an outer panel 104. The outer panel 104 is provided with a guide groove 106 which is defined by side walls 108 and 110 and a bottom wall 112 of the outer panel 104. The guide groove 106 extends into a curved configuration or a generally stepped configuration such as a gently curved generally S-shaped or crank-shaped configuration for moving the movable door glass 40 without interfering with door parts inside the vehicle door.

A guide roller is secured to the inside face of the movable door glass 40 so as to be fitted in the guide groove 106. When the guide roller moves along the guide groove 106, the movable door glass 40 is guided upwardly and downwardly. Therefore, even where door parts such as a door locking mechanism, etc. are provided inside the vehicle door, the movable door glass 40 can be smoothly raised and lowered without interfering with such door parts.

The outer panel 104 extends flatly from the guide groove 106 towards a rear end thereof, and the rear edge of the outer panel 104 joins a rear edge of the inner panel 102 to define a rear edge 114 of the door frame 42, which is adapted to face a center pillar 116 (FIG. 4) when the front door 36 is closed.

The first door glass weather strip 48 is attached to the rear edge 114 of the door frame 42. The first door glass weather strip 48 includes the base portion 80 and the seal lip 82. The base portion 80 is secured to an outside face of the rear edge 114 of the door frame 42 with clips 118 and the double-sided adhesive tape, and the seal lip 82 contacts and seals the inside face of the movable door glass 40. The base portion 80 may integrally have a seal lip 120 which projects rearwards from a rear edge thereof for contacting a door frame of the rear door 38. The seal lip 120 prevents rainwater, dust, noise, etc. which have intruded via the gap between the movable door glasses of the front door 36 and the rear door 38 from flowing inwardly of the center pillar 116. In addition, the seal lip 120 can close the gap between the front door 36 and the rear door 38, thereby preventing the generation of wind noise, etc. therein. And the seal lip 120 has flexibility so that, when the front door 36 contacts a front edge of the rear door 38 upon opening and closing of the front door 36, the seal lip 120 can bend flexibly so as not to increase a door closing force. The seal lip 120 may be formed separately from the first door glass weather strip 48.

The second door glass weather strip 50 is attached to a flange provided by joining front edges of the inner panel 102 and the outer panel 104 on a front side of the guide groove 106. The second door glass weather strip 50 includes the base portion 84 and the seal lip 86. The base portion 84 has a plate-shaped configuration, and is attached to the side wall 108 of the outer panel 104 with a double-sided adhesive tape, etc. The base portion 84 may be attached with clips or by fitting the base portion 84 to the flange. The seal lip 86 extends from a front edge of the base portion 84 and contacts the inside face of the movable door glass 40 on the front side of the contacting position of the seal lip 82 of the first door glass weather strip 48.

With this arrangement, the rear end of the movable door glass 40 can be doubly sealed with the first door glass weather strip 48 and the second door glass weather strip 50.

If the movable door glass 40 moving along the guide groove 106 comes off the first door glass weather strip 48, the second door glass weather strip 50 continuously contacts the movable door glass 40 so that a secure seal can be provided between the movable door glass 40 and the door frame 42.

In addition, when the movable door glass 40 is raised to its closed position, the seal lips 82 and 86 contact the inside face of the movable door glass 40 flexibly to provide a double seal between the movable door glass 40 and the door frame 42.

In a corner of the door frame 42, as shown in FIG. 5, the upper part of each of the first door glass weather strip 48 and the second door glass weather strip 50 is integrally connected to the vertical part thereof while gradually varying the cross-sectional shape thereof, thereby contacting and sealing a corner part of the movable door glass 40.

The corner part of each of the first door glass weather strip 48 and the second door glass weather strip 50 is obtained by molding, after the upper part and the vertical part are respectively formed by extrusion, and vulcanized.

The door weather strip 90 is also provided in the corner and the vertical part of the door frame 42 as well as the upper part thereof continuously.

As shown in FIG. 4, a fixed door glass 122 is secured to the door frame 42 of the rear door 38 in addition to the movable door glass 40. The fixed door glass 122 may be provided in the front door 36. In both the front door 36 and the rear door 38, the movable door glass 40 and the fixed door glass 122 are located outside the door frame 42.

Figure 8:
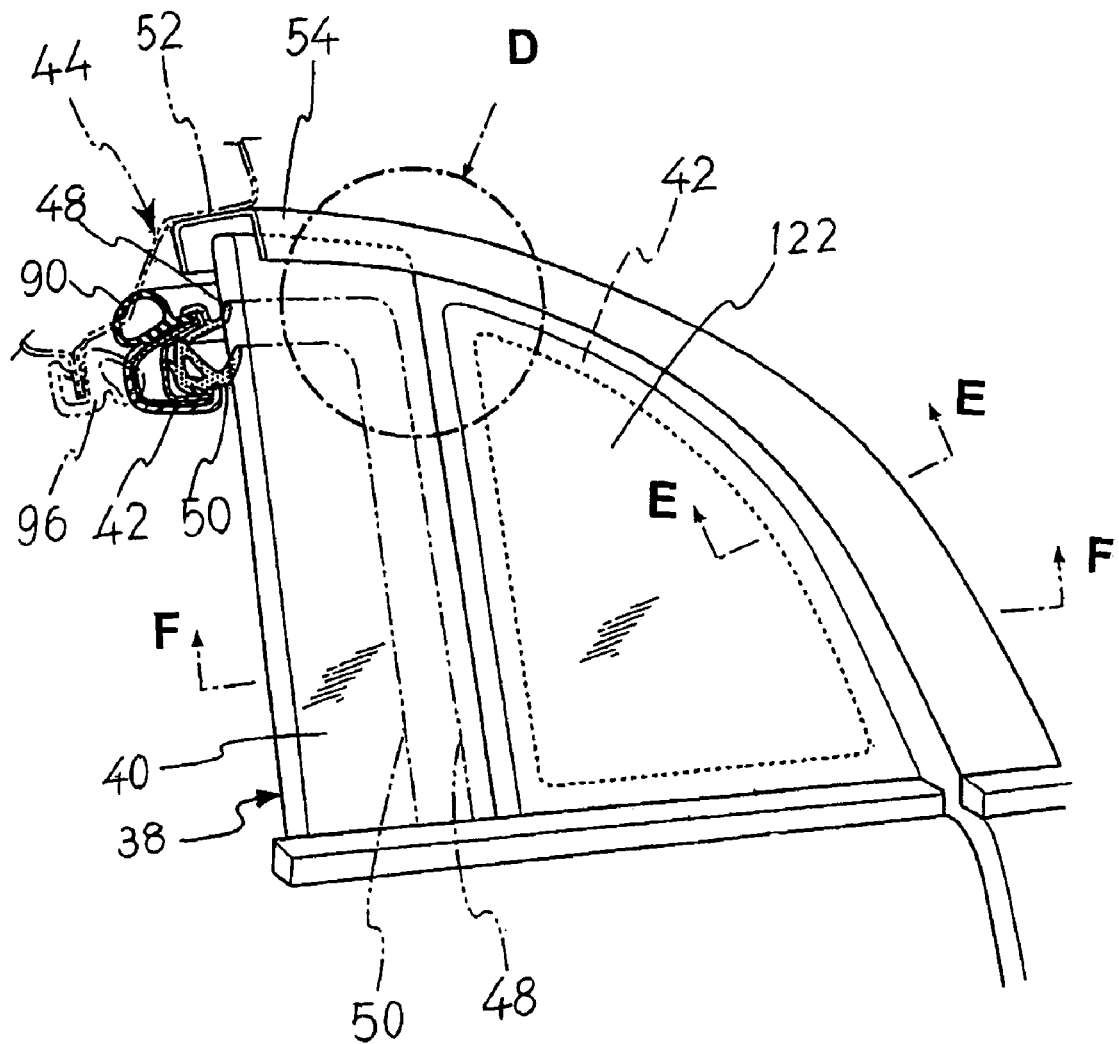
FIG. 8 is a partially cut away perspective view illustrating an upper rear part of a rear door in one embodiment of the sealing structure in accordance with the present invention.
Figure 9:
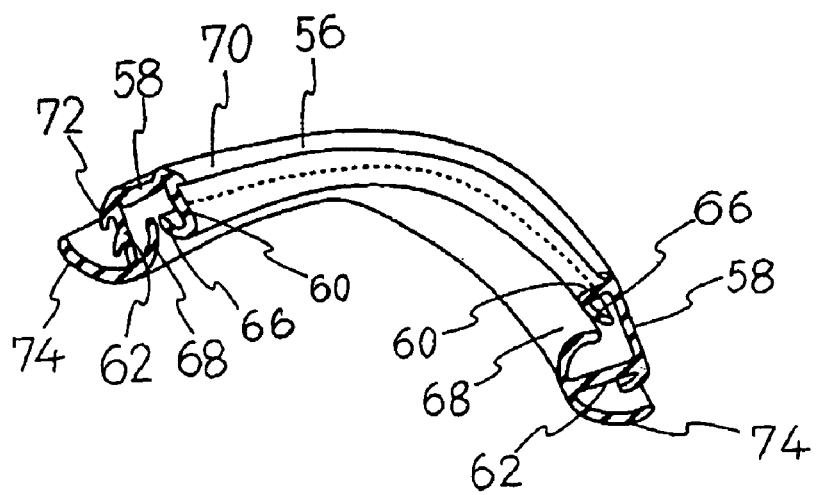
FIG. 9 is a partially cut-away perspective view illustrating a roof weather strip in the portion encircled by D of FIG. 8.

FIG. 8 is a partially cut away perspective view illustrating an upper rear part of the rear door 38, and illustrates a rear part of the movable door glass 40 and the fixed door glass 122, and FIG. 9 is a partially cut away perspective view of a roof weather strip in the area designated as D in FIG. 8.

As shown in FIG. 6, the roof weather strip 56 is secured to the roof moulding 54, and extends to the rear end of the roof moulding 54. When the movable door glass 40 of the closed rear door 38 is raised, the roof weather strip 56 receives and seals the upper edge of the movable door glass 40, similarly to the case of the front door 36.

As shown in FIG. 9, in the area D of FIG. 8, the cross-section of the roof weather strip 56 differs between the part facing the upper edge of the movable door glass 40 and the part facing an upper edge of the fixed door glass 122. And in the area between the above-described two parts, the roof weather strip 56 is formed by molding so as to gradually change the cross-section thereof gradually. And the seal lip 68 contacts and seals an end edge of the fixed door glass 122 securely.

Figure 10:
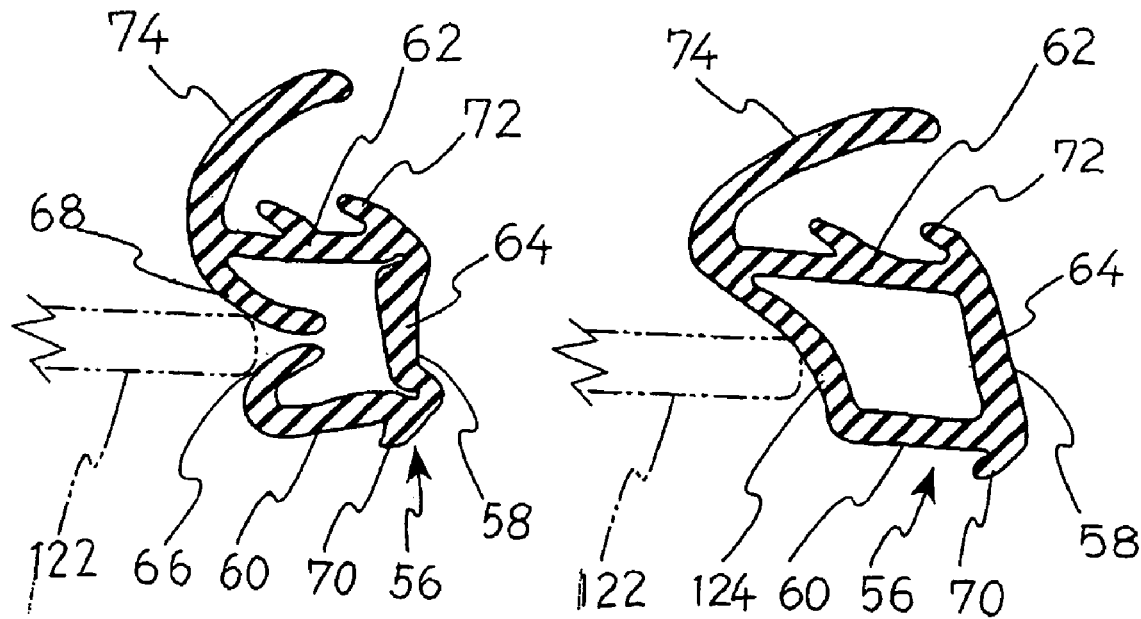
FIG. 10(A) is a cross-sectional view of a roof weather strip in one embodiment of the present invention, which is taken along the line E—E of FIG. 8.
FIG. 10(B) is a cross-sectional view of a roof weather strip in another embodiment of the present invention, which is taken along the line E—E of FIG. 8.

FIG. 10(A) and FIG. 10(B) are respectively a cross-sectional view taken along the line E—E of FIGS. 4 and 8, and illustrate different types of the roof weather strip 56 attached around the fixed door glass 122. In FIG. 10(B), parts identical to parts shown in FIG. 10(A) are denoted by the same numerals.

Similarly to the roof weather strip 56 for the movable door glass 40, the roof weather strip 56 illustrated in FIG. 10(A) has a main body 58 with a generally U-shaped cross-section, which includes side walls 60 and 62 and a bottom wall 64. Seal lips 66 and 68 obliquely project from ends of the side walls 60 and 62 to the interior of the main body 58, respectively. The width of the side wall 62 located inwardly of the side wall 60 is made greater than that of the side wall 60, and the width of the seal lip 68 projecting from the side wall 62 is made greater than that of the other seal lip 66.

The roof weather strip 56 illustrated in FIG. 10(B) also has a main body 58 with a generally U-shaped cross-section, which includes side walls 60 and 62 and a bottom wall 64. A seal Wall 124 is integrally formed with the side walls 60 and 62 to close an opening of the main body 58 with a generally U-shaped cross-section. The width of the side wall 62 located inwardly of the side wall 60 is made greater than that of the side wall 60, and the seal wall 124 extends slantwise so as to receive the end edge of the fixed door glass 122 when the rear door 38 is closed.

In the roof weather strips 56 of FIGS. 10(A) and 10(B), holding lips 70 and 72 are provided in outer faces of the side walls 60 and 62 so as to engage with projections provided in inner faces of side walls of the roof moulding 54, whereby the roof weather strips 56 are held by the roof moulding 54. A cover lip 74 protrudes from the end of the side wall 62 and contacts the door opening portion 44 so as to cover an end of the inner side wall of the roof moulding 54 and a space between the roof moulding 54 and the door opening portion 44.

The roof weather strips 56 of FIGS. 10(A) and 10(B) are composed of a non-foamed rubber, soft synthetic resin, thermoplastic elastomer, etc. and are formed by extrusion. The roof weather strip 56 for the fixed door glass 122 is connected to the roof weather strip 56 for the movable door glass 40 by molding. And resultant one piece roof weather strip 56 is attached to the roof moulding 54 over the entire length thereof from the position facing the front end of the front door 36 to the position facing the rear end of the rear door 38.

Figure 11:
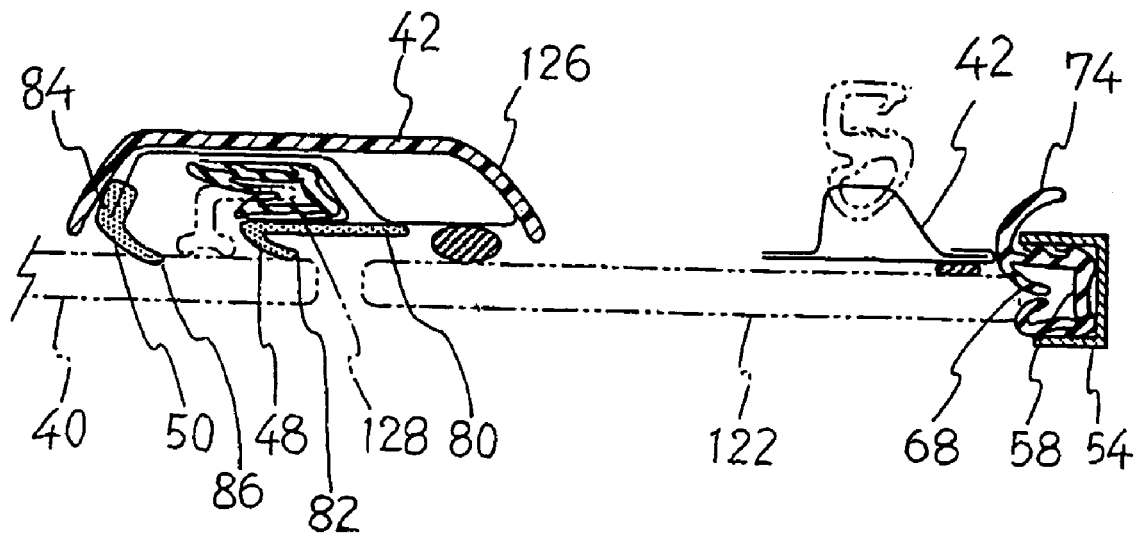
FIG. 11 is a cross-sectional view taken along the line F—F of FIG. 8.

As shown in FIG. 10(A) and FIG. 11, the width of the side wall 62 of the roof weather strip 56 is made greater than that of the side wall 60 such that when the rear door 38 is turned for closing, the end edge of the fixed door glass 122 can pass the side wall 60 without contacting the same. The end edge of the fixed door glass 122 contacts and seals the seal lip 68 projecting form the side wall 62. The seal lip 68 can bend along a joint between the seal lip 68 and the side wall 62 so that even where there is any scattering in the attaching position of the fixed door glass 122, the seal lip 68 can contact the fixed door glass 122 continuously.

In addition, since the width of the side wall 60 is made smaller, it is not greatly exposed from the roof moulding 54, and accordingly less outstanding when seen from the outside of the motor vehicle.

And sine the seal lip 66 does not contact the fixed door glass 122, the seal lip 66 may not be provided. But, in the present embodiment, the seal lip 66 is provided for preventing air, etc. from entering the interior of the main body 58 of the roof weather strip 56.

Where the roof weather strip 56 has the configuration shown in FIG. 10(B), the width of the side wall 62 is made greater than that of the side wall 60 such that when the rear door 38 is turned for closing, the end edge of the fixed door glass 122 can pass the side wall 60 without contacting the same, similarly to the roof weather strip 60 shown in FIG. 10(A). Accordingly, when the rear door 38 is closed, the end edge of the fixed door glass 122 contacts the seal wall 124 which extends slantwise, and is wrapped with the seal wall 124. Consequently, even where there is any scattering in the attaching position of the fixed door glass 122, the seal wall 124 can seal the end edge of the fixed door glass 122 against the roof moulding 54 continuously.

In this case, since the seal wall 124 covers the opening of the main body 58 of the roof weather strip 56, air, etc. is prevented from entering the interior of the main body 58 of the roof weather strip 56.

As shown in FIG. 8, the door frame 42 is provided inside the movable door glass 40 and the fixed door glass 122.

Two door glass weather strips 48 and 50 are attached to the door frame 42 along an upper edge of the movable door glass for sealing the gap between the door frame 42 and the movable door glass 40 and supporting the movable door glass 40 from the inside thereof. The sealing structure in the upper part of the door frame 42 is substantially the same as the case of the upper part of the door frame for the movable door glass provided in the front door 36, which is shown in FIG. 5. Therefore, explanations thereof will be omitted.

As shown in FIG. 8, along the side edge of the movable door glass 40, two door glass weather strips 48 and 50 extend downwards continuously with those for the upper edge of the movable door glass 40, and seals a side end of the movable door glass 40. FIG. 11 is a cross-sectional view taken along the line F—F of FIG. 8, and shows the cross-section of a vertical part 126 of the door frame 42 provided between the movable door glass 40 and the fixed door glass 122. As shown, the vertical part 126 of the door frame 42 is provided inside the movable door glass 40 and the fixed door glass 122, and the first door glass weather strip 48 is attached to the vertical part 126 of the door frame 42 with a double-sided adhesive tape and clips such that the seal lip 82 contacts the side edge of the movable door glass 40.

In the vertical part 126 of the door frame 42, a guide groove 128 with a generally U-shaped cross-section is provided, and a guide roller which is secured to the movable door glass 40 is inserted in the guide groove 128 for guiding the moving of the movable door glass 40. The guide groove 128 serves to separate the movable door glass 40 from the door parts inside the vehicle door, and guide the movable door glass 40 without interfering with such door parts.

The base portion 84 of the second door glass weather strip 50 is attached to the vertical part 126 of the door frame 42 on the front side of the guide groove 128, and the seal lip 86 contacts and seals the inside face of the movable door glass 40 on the front side of the contacting position of the seal lip 82 of the first door glass weather strip 48.

The fixed door glass 122 has a generally triangular flat configuration, and is bonded to the door frame 42 provided inside the fixed door glass 6 with an adhesive agent.

The first door glass weather strip 48 and the second door glass weather strip 50 are composed of a non-foamed rubber, soft synthetic resin, thermoplastic elastomer, etc. and are formed by extrusion. The base portions 80 and 84 and the seal lips 82 and 86 are composed of a non-foamed material. The seal lips 82 and 86 may be composed of a sponge material.

As shown in FIG. 8, the door weather strip 90 is attached to the door frame 42 and seals the gap between the door frame 42 and the door opening portion 44.

The construction of the door weather strip 90 for attachment to the upper part of the door frame 42 is substantially the same as that of the door weather strip 90 for attachment to the upper part of the door frame for the movable door glass provided in the front door 36, which is shown in FIG. 5. Therefore, explanations thereof will be omitted.

Figure 12:
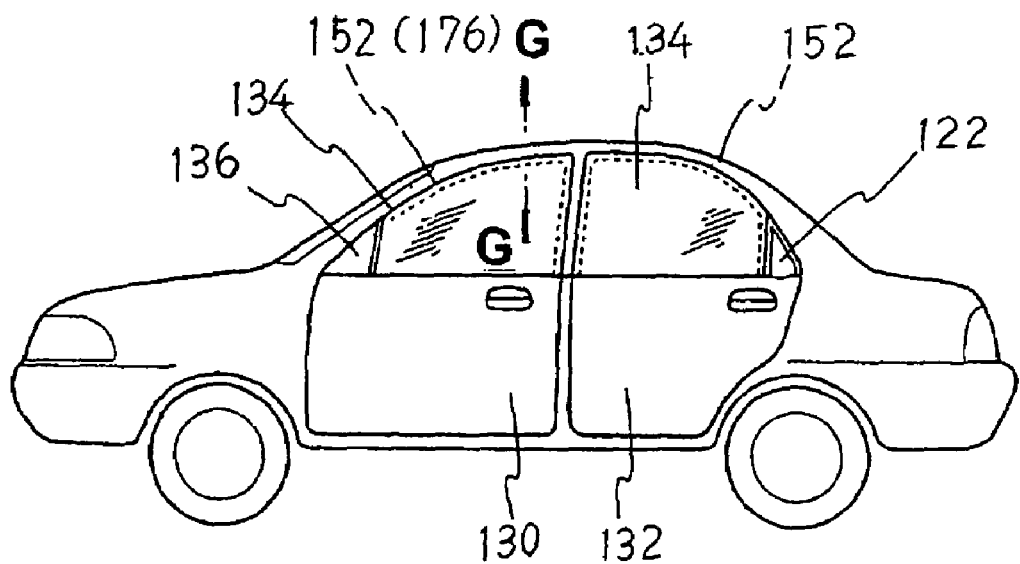
FIG. 12 is a side view of a motor vehicle provided with a still another embodiment of a sealing structure in accordance with the present invention, for sealing a movable door glass of a vehicle door having a door mirror base.

FIG. 12 is a side view of another type of a motor vehicle. As shown, in each of a front door 130 and a rear door 132, a movable door glass 134 is mounted above the door belt line so as to be raised and lowered. No door frame is provided around the movable door glass 134. A door mirror base 136 is provided in a front end of the front door 130 above the door belt line for securing a door mirror.

Figure 13:
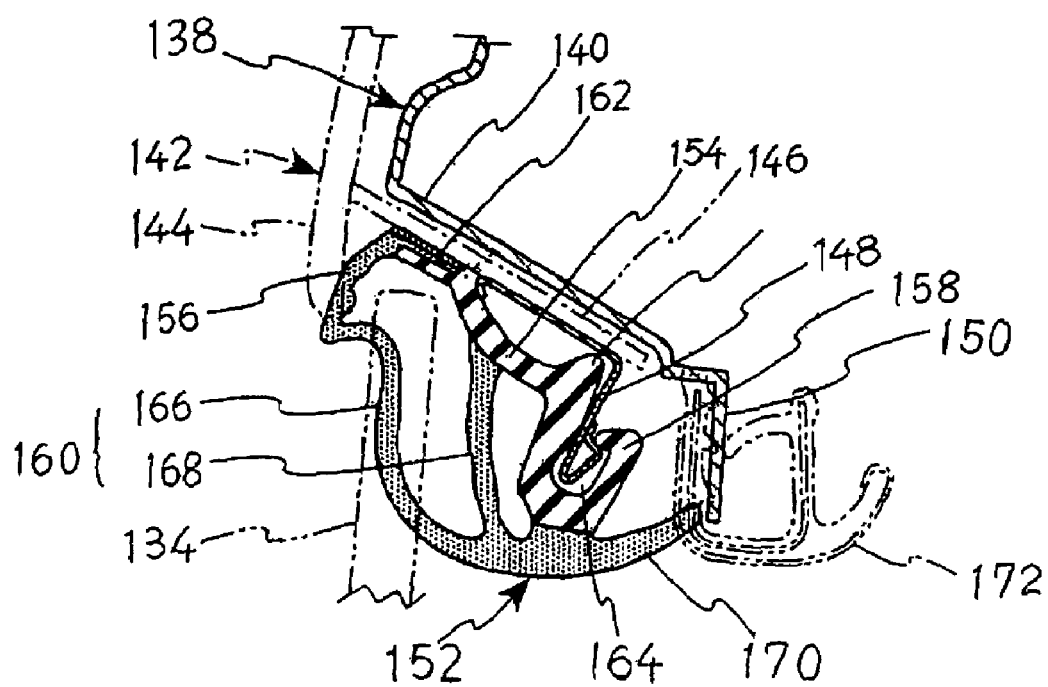
FIG. 13 is a cross-sectional view taken along the line G—G of FIG. 12.

FIG. 13 is a cross-sectional view taken along the line G—G of FIG. 12. As shown, in a door opening portion 138 of a vehicle body, a roof panel defines a flat face 140 for receiving upper edges of the front door 130 and the rear door 132 which are in their closed positions. A roof moulding 142 with a generally T-shaped cross-section is attached to the flat face 140.

The roof moulding 142 includes a panel part 144 extending along the door opening portion 138 from the front end to the rear end thereof, and an attaching leg 146 which extends from a rear face of the panel part 144. Upon attaching of the roof moulding 142, the attaching leg 146 is secured to the flat face 140 of the door opening portion 138 with screws, etc.

A retainer 148 with a generally L-shaped cross-section is provided inside the attaching leg 146 of the roof moulding 142. One side of the retainer 148 is closely attached to the attaching leg 146 and the other side of the retainer 148 extends downwardly of an inside end of the attaching leg 146, and has a hook-shaped end.

The roof panel defines a flange 150 at an inside end thereof, and a trim 172 with a generally U-shaped cross-section is attached to the flange 150 for improving the appearance of the interior of the vehicle body and protecting vehicle passengers.

And a door glass weather strip 152 is attached to the roof moulding 142. The door glass weather strip 152 has a base portion 154, an outer side wall 156, an inner side wall 158 and a tubular seal portion 160. An outside part of the base portion 154 has a plate-shaped configuration and is bonded to the attaching leg 146 of the roof moulding 142 with a double-sided adhesive tape 162. An inside part of the base portion 154 has a curved configuration, and defines a groove 164 for fitting the hook-shaped end of the retainer 148. When the upper edge of the movable door glass 134 contacts the door glass weather strip 152, the curving inside part of the base portion 154 can achieve a cushioning operation against the movable door glass 134. With this arrangement, the door glass weather strip 152 can be secured to the roof moulding 142 with the double-sided adhesive tape 162 and the retainer 148.

The base portion 154 and the inner side wall 158 are composed of a non-foamed material such as a non-foamed rubber, hard thermoplastic elastomer, etc., and accordingly enable the door weather strip 152 to be attached without any deformation.

In the attaching state of the door weather strip 152, a lower end of the outer side wall 156 contacts and seals the rear face of the panel part 144 of the roof moulding 142.

The tubular seal portion 160 is provided by connecting ends of the outer side wall 156 and the inner side wall 158 to each other. The tubular seal portion 160 includes a seal wall 166 extending from the end of the outer side wall 156 to the end of the inner side wall 158 into a curved configuration, and a bridge wall 168 extending across the tubular seal portion 160 inside the seal wall 166.

When the front door 130 is closed with the movable door glass 134 in its closed position, the movable door glass 134 is raised slightly with a door glass slightly moving system, and an upper edge of the movable door glass 134 pushes the seal wall 166 of the door weather strip 152 attached to the roof moulding 142. As a result, the movable door glass 134 is sealed and held with the door glass weather strip 152.

Upon opening of the front door 130, the movable door glass 134 is slightly lowered from the above-described position with the door glass slightly moving system, and is stopped at the position where the upper edge of the movable door glass 134 is lower than a lower end of the panel part 144 of the roof moulding 142. In this state, the front door 130 is opened. Therefore, the upper edge of the movable door glass 134 does not interfere with the lower end of the roof moulding 142 so that the front door 130 can be opened smoothly.

And while the front door 130 is opened, the movable door glass 134 is held at the slightly lowered position.

Next, upon closing of the front door 130, the upper edge of the movable door glass 134 is located at the slightly lower position so that it can pass under the panel part 144 of the roof moulding 142. And after the front door 130 is closed, the movable door glass 134 slightly rises automatically, and the upper edge thereof contacts the seal wall 166 of the tubular seal portion 160, thereby sealing the gap between the upper edge of the movable door glass 134 and the door glass weather strip 152. At this time, the bridge wall 168 prevents the seal wall 166 from abnormally deforming, thereby effecting good sealing properties.

A cover lip 170 protrudes inwardly from an end of the inner side wall 158. A protruding end of the cover lip 170 contacts the trim 172 which is secured to the flange 150, and covers attaching positions of the roof moulding 142 and the retainer 148, thereby improving the appearance around the door opening portion 138.

Figure 14:
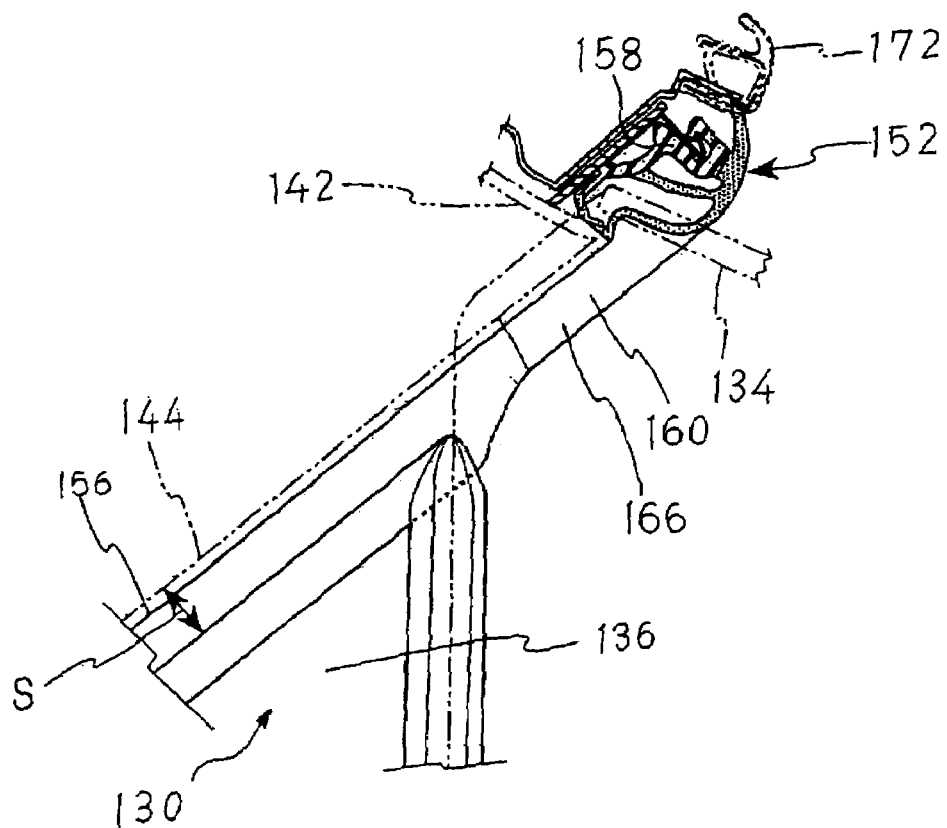
FIG. 14 is a partially cut-away perspective view illustrating the contacting state of upper edges of a door mirror base and a movable door glass against a door glass weather strip in the still another embodiment of a sealing structure of FIG. 12.

As shown in FIG. 14, when the front door 130 is closed, a space S is provided between an upper edge of the door mirror base 136 and a facing lower end of the panel part 144 of the roof moulding 142 for enabling the front door 130 to be closed and opened smoothly. Accordingly, the width of the seal wall 166 of the tubular seal portion 160 as well as the width of the inner side wall 158 is increased downwardly in the area which is adapted to contact the upper edge of the door mirror base 136.

And in the border area between the area adapted to contact the movable door glass 134 and the area adapted to contact the door mirror base 136, the widths of both the seal wall 166 and the inner side wall 158 of the door weather strip 152 gradually vary to connect adjacent areas smoothly.

A front edge of the movable door glass 134 moves upwardly along a groove provided in a rear edge of the door mirror base 136, and contacts the seal wall 166. Consequently, the border between the movable door glass 134 and the door mirror base 136 is sealed with the seal wall 166 in the area in which the width of the seal wall 166 as well as the width of the inner side wall 158 gradually vary.

Therefore, even if the position of the border between the movable door glass 134 and the door mirror base 136 varies due to the assembling error, etc. of the front door 130, the upper edges of the movable door glass 134 and the door mirror base 136 can contact the tubular seal portion 160 so as to be securely sealed thereby.

The door glass weather strip 152 is formed in the following manner. First, the area adapted to contact the movable door glass 134 is formed by extrusion into a generally straight configuration in a longitudinal direction. The area adapted to contact the door mirror base 136 may be formed by extrusion. Alternatively, this area may be formed by molding with the border area using an identical mold, because the area adapted to contact the door mirror base 136 is short.

Figure 15:
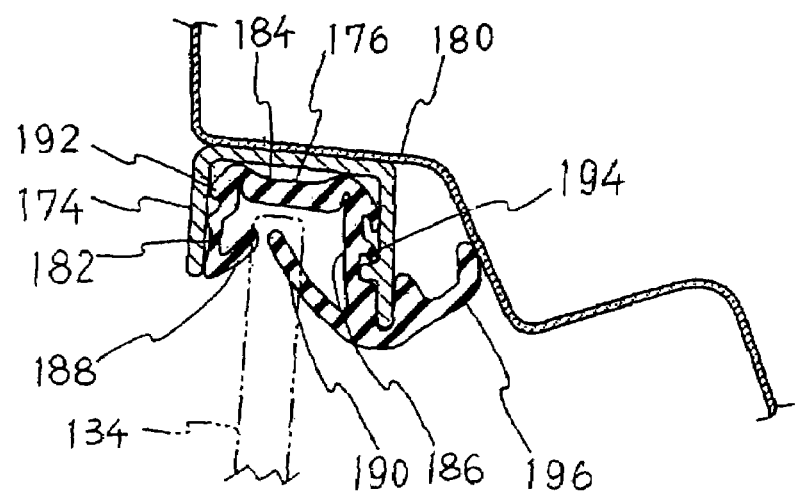
FIG. 15 is a cross-sectional view of a door glass weather strip in a further embodiment of a sealing structure in accordance with the present invention, which is taken along the line G—G of FIG. 12.
Figure 16:
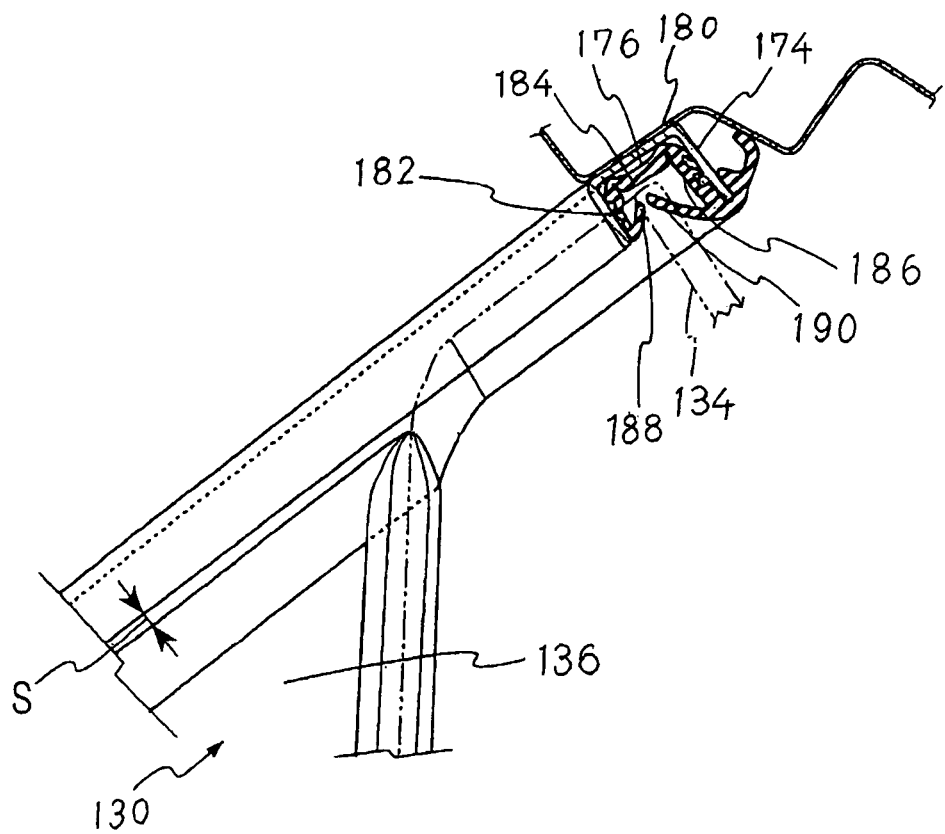
FIG. 16 is a partially cut-away perspective view illustrating the contacting state of upper edges of a door mirror base and a movable door glass against a door glass weather strip in the further embodiment of a sealing structure in accordance with the present invention.

FIG. 15 and FIG. 16 illustrate another sealing structure for a front door provided with a door mirror base. Only different points from the sealing structure shown in FIGS. 13 and 14 will be explained.

FIG. 15 is a cross-sectional view taken along the line G—G of FIG. 12, and illustrates the attaching state of a roof moulding 174 and a door glass weather strip 176 when the movable door glass 134 is in its closing position, and FIG. 16 is a perspective view illustrating the contacting state of the upper edges of the door mirror base 136 and the movable door glass 134 against the door glass weather strip 176.

As shown, the roof moulding 174 having a generally U-shaped cross-section is attached along a door opening portion 180, and the door glass weather strip 176 is attached inside the roof moulding 174. The door glass weather strip 176 has a generally U-shaped cross-section, and includes an outer side wall 182, a bottom wall 184 and an inner side wall 186. An outer seal lip 188 and an inner seal lip 190 obliquely project inwardly from ends of the outer side wall 182 and the inner side wall 186, respectively.

Holding lips 192 and 194 are provided in outer faces of the outer side wall 182 and the inner side wall 186 so as to engage with projections provided in inner faces of side walls of the roof moulding 174, whereby the door glass weather strip 176 is held by the roof moulding 174. A cover lip 196 protrudes from the end of the inner side wall 186 and contacts the door opening portion 180 so as to cover the end of roof moulding 174 and the space between the roof moulding 174 and the door opening portion 180.

The door glass weather strip 176 thus arranged is composed of a non-foamed rubber, soft synthetic resin, thermoplastic elastomer, etc. and is formed by extrusion.

When the front door 130 is closed with the movable door glass 134 closed, the movable door glass 134 slightly rises and the upper edge thereof is inserted in the interior of the roof moulding 174, and sealed and held by the seal lips 188 and 190 of the door glass weather strip 176.

Upon opening and closing of the front door 130, the movable door glass 134 is slightly lowered or raised with a door glass slightly moving system, similarly to the preceding sealing structure shown in FIG. 14.

Upon closing of the front door 130 with the movable door glass 134 raised to its closed position, the upper edge of the movable door glass 134 is supported with the roof moulding 174 via the door glass weather strip 176. Therefore, the movable door glass 134 is prevented from vibrating and deflecting outwardly. And the seal lips 188 and 190 of the door glass weather strip 176 contact and seal both an outside face and an inside face of the upper edge of the movable door glass 134.

As shown in FIG. 16, when the front door 130 is closed, a space S is provided between an upper edge of the door mirror base 136 and a facing lower end of an outer side wall of the roof moulding 174 for enabling the front door 130 to be closed and opened smoothly. Accordingly, the width of the seal lip 190 as well as the width of the inner side wall 186 of the door glass weather strip 176 is increased downwardly.

And in the border area between the area adapted to contact the movable door glass 134 and the area adapted to contact the door mirror base 136, the widths of both the seal lip 190 and the inner side wall 186 gradually vary to connect the above-described two areas smoothly.

A front edge of the movable door glass 134 moves upwardly along a rear edge of the door mirror base 136, thereby sealing the gap between the movable door glass 134 and the door mirror base 136. Consequently, the border between the movable door glass 134 and the door mirror base 136 is sealed with the inner seal lip 190 in the area in which the width of the inner seal lip 190 as well as the width of the inner side wall 186 gradually vary.

Therefore, even if the position of the border between the movable door glass 134 and the door mirror base 136 varies due to the assembling error, etc. of the front door 130, the upper edges of the movable door glass 134 and the door mirror base 136 can contact the inner seal lip 190 with good sealing properties.

Next, the method for producing the door glass weather strips 152 and 176 will be explained. At first, straight parts of these door glass weather strips 152 and 176, which are adapted to contact the movable door glass 134, are formed by extrusion. The straight parts adapted to contact the door mirror base 136 may be formed by extrusion, or molding at the same time with the molding of the border parts of the door glass weather strips 152 and 176.

Synthetic rubber, thermoplastic elastomer, or soft synthetic resin is used as the forming material. Examples of the synthetic rubber include EPDM rubber, examples of the thermoplastic elastomer include olefin-based elastomer, examples of the soft synthetic resin include soft vinyl chloride. In the case of the synthetic rubber, after extruded, an extruded body is transferred into a vulcanizing room, and is heated with hot wind, high frequency wave, etc. for vulcanization. In the case of the thermoplastic elastomer, and the soft synthetic resin, the extruded body is cooled for solidification. And then, the obtained body are cut into a predetermined length.

Next, the portions adapted to contact the border between the door mirror base 136 and the movable door glass 134, and adapted to contact the door mirror base 136 are formed by placing ends of the extruded bodies in a mold, and injecting a non-foamed material or a sponge material into a cavity of the mold. It is preferable that a resultant molded portion has the cross-sectional shape which varies gradually for connecting the extruded bodies. It is preferable to use the material of the same kind as that of the material used upon extrusion. In the case of the synthetic rubber, the mold is heated after injecting the synthetic rubber for vulcanization. At this time, the extruded bodies and the molded bodies which are composed of the identical material or the same kind of material can be vulcanized and bonded so as to be bonded integrally. In the case of the thermoplastic elastomer and the soft synthetic resin, the material is melted when injected into the mold so that the molded bodies are integrally welded to the extruded bodies.

Figure 17:
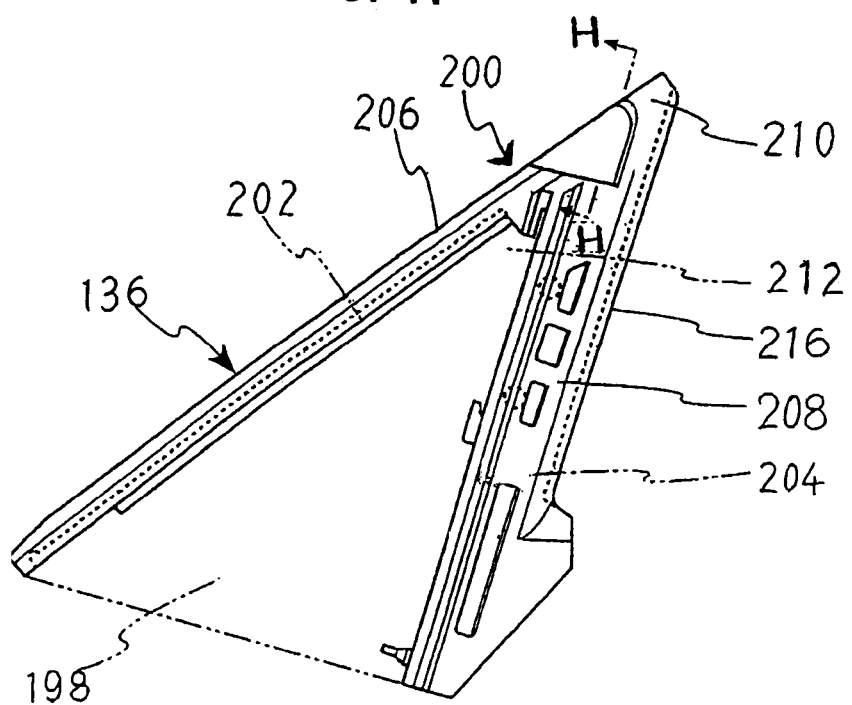
FIG. 17 is a plan view of a door mirror base in embodiments of a sealing structure in accordance with the present invention.
Figure 18:
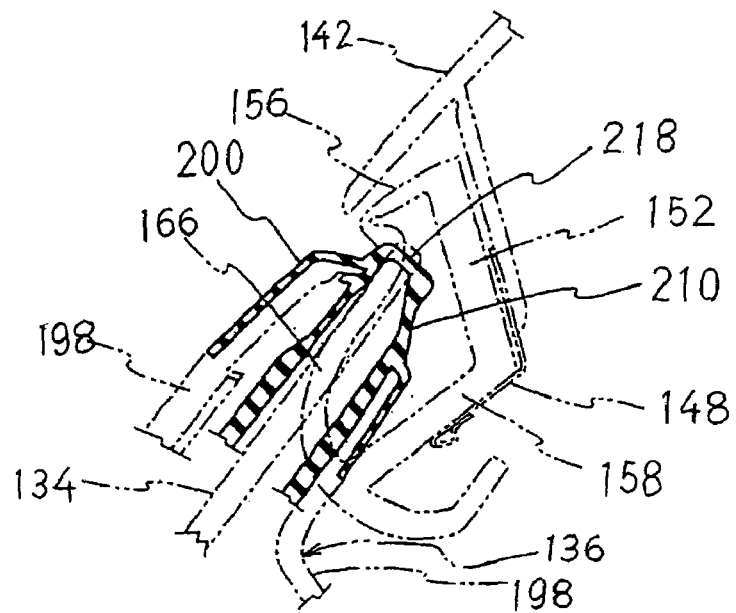
FIG. 18 is a partially cut-away cross-sectional view taken along the line H—H of FIG. 17.

FIG. 17 is a plan view of the door mirror base 136 used in one embodiment of a sealing structure in accordance with the present invention. As shown, the door mirror base 136 has a main body 198 with a triangular configuration, and a door mirror weather strip 200 is attached along an upper side 202 and a vertical side 204 of the main body 198. FIG. 18 is a cross-sectional view taken along the line H—H of FIG. 17. In the present embodiment, the roof moulding 142 used in the embodiment shown in FIG. 13 extends to a front pillar of a vehicle body.

The main body 198 of the door mirror base 136 is composed of a hard synthetic resin, metal plate, etc. which exhibit a high rigidity for mounting a door mirror.

The door mirror weather strip 200 includes an upper part 206 for attachment to the upper side 202 of the main body 198, a vertical part 208 for attachment to the vertical side 204 of the main body 198 and a tapered end part 210 for attachment to a tapered end 212 of the main body 198, at which the upper side 202 and the vertical side 204 cross each other, and has a generally V-shaped configuration.

When the front door 130 is closed, the upper part 206 of the door mirror weather strip 200 contacts the seal wall 166 (FIG. 13) of the door glass weather strip 152, and seals the gap between the door opening portion 138 and the door mirror base 136. The construction of the door glass weather strip 152 and the attaching structure of the door glass weather strip 152 along with the roof moulding 142 are substantially equal to those shown in FIG. 13, and accordingly, explanations thereof will be omitted. A front edge of the movable door glass 134 is inserted in the vertical part 208 of the door mirror weather strip 200 and guided thereby. The vertical part 208 of the door mirror weather strip 200 seals the gap between the movable door glass 134 and the door mirror base 136.

The door mirror weather strip 200 is composed of a synthetic rubber, thermoplastic elastomer, soft synthetic resin, etc. which exhibit flexibility for improving the sealing properties thereof.

Figure 19:
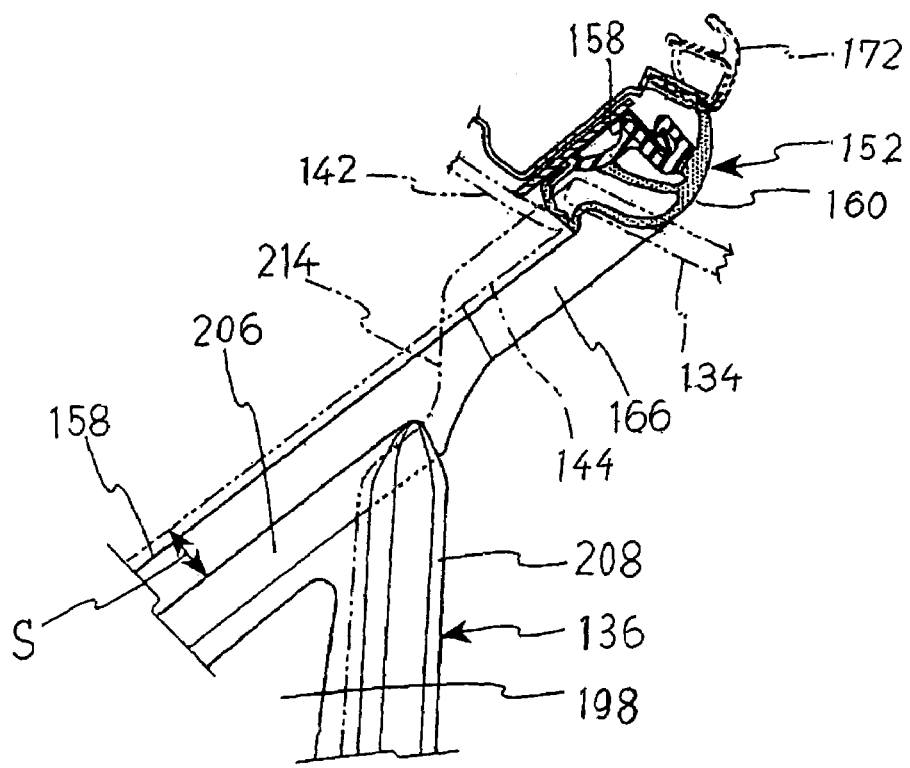
FIG. 19 is a partially cut-away perspective view illustrating the contacting state of upper edges of a door mirror base and a movable door glass against a door glass weather strip in a still further embodiment of a sealing structure in accordance with the present invention.

As shown in FIG. 19, when the front door 130 is closed, the upper part 206 of the door mirror weather strip 200 contacts the seal wall 166 of the door glass weather strip 152.

There is provided a space S between the upper part 206 of the door mirror weather strip 200 and the lower end of the panel part 144 of the roof moulding 142. Accordingly, in order to enable the upper part 206 of the door mirror weather strip 200 and the seal wall 166 of the door glass weather strip 152 to contact each other, the width of the seal wall 166 as well as the width of the inner side wall 158 is increased downwardly.

And in the border between the area adapted to contact the movable door glass 134 and the area adapted to contact the door mirror base 136, the widths of both the seal wall 166 and the inner side wall 158 gradually vary to connect the above-described two areas smoothly.

An upper front corner of the movable door glass 134 has a depression 214 which is depressed downwardly. As shown in FIG. 18, the tapered end 210 of the door mirror weather strip 200 contacts the seal wall 166 of the door glass weather strip 152. When the movable door glass 134 is raised, the part below the depression 214 of the movable door glass 134 is seated inside the tapered end part 210, while the part above the depression 214 contacts the seal wall 166 in the area wherein its configuration gradually varies.

When the movable door glass 134 moves upwardly and downwardly, the front edge of the movable door glass 134 moves along a groove 216 provided in the vertical part 208 of the door mirror weather strip 200. In the tapered end part 210, a seal wall 218 extends continuously from the upper part 206 of the door mirror weather strip 200. When the movable door glass 134 moves upwardly and is positioned at its uppermost position with the door glass slightly moving system, the front corner of the movable door glass 134 contacts the seal wall 218 of the door mirror weather strip 200 on the upper side of the depression 214 to seal the gap between the door mirror weather strip 200 and the depression 214 of the movable door glass 134.

Therefore, the depression 214 of the movable door glass 134 can contact the seal wall 218 of the door mirror weather strip 200 in generally parallel or at an angle therewith.

Therefore, even if the movable condition and assembling position of the movable door glass 134 vary, the movable door glass 134 does not press the seal wall 218 greatly, as compared with the case the front corner has a convex configuration, so that the seal wall 218 is prevented from breaking or abnormally deforming.

In addition, in the border between the area adapted to contact the movable door glass 134 and the area adapted to contact the door mirror base 136, the cross-sectional shapes of the seal wall 166 and the inner side wall 158 gradually vary to provide a seal in the border between the movable door glass 134 and the door mirror base 136.

Therefore, even if the position of the border between the movable door glass 134 and the door mirror base 136 varies due to the assembling error, etc. of the front door 130, the upper edges of the movable door glass 134 and the door mirror base 136 can contact the tubular seal portion 160 with good sealing properties.

Figure 20:
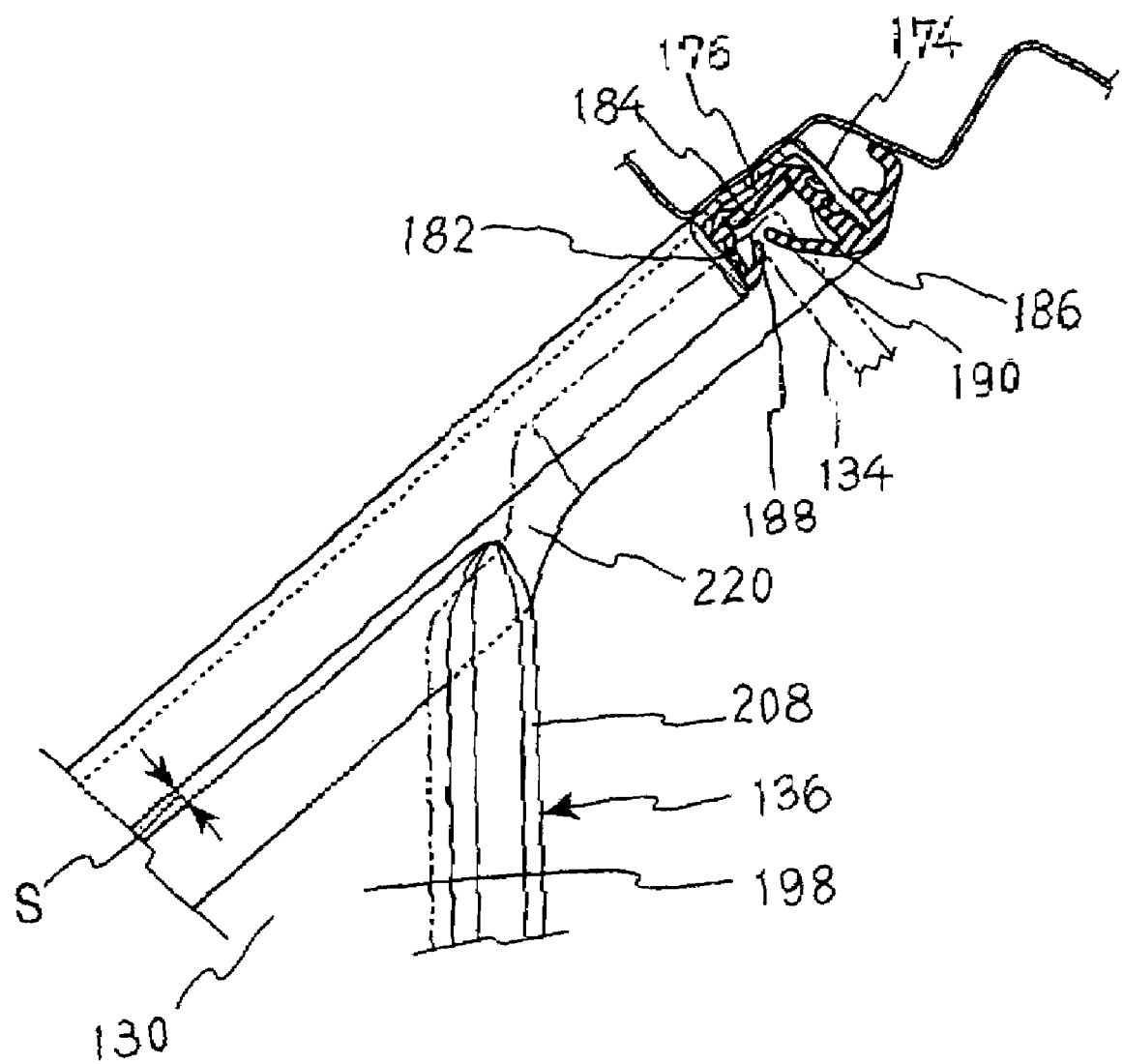
FIG. 20 is a partially cut-away perspective view illustrating the contacting state of upper edges of a door mirror base and a movable door glass against a door glass weather strip in an additional embodiment of a sealing structure in accordance with the present invention.

FIG. 20 illustrates still another embodiment of the present invention, and is a perspective view illustrating the contacting state of the border between the upper edges of the door mirror base 136 and the movable door glass 134 against the door glass weather strip 176. In the present embodiment, the door glass weather strip and the roof moulding are different from those of the preceding embodiment in cross-sectional configuration. The cross-sectional configurations of the door glass weather strip and the roof moulding of the present embodiment are substantially equal to those illustrated in FIG. 15. Accordingly, explanations thereof will be omitted.

As shown in FIG. 20, an upper front corner of the movable door glass 134 has a depression 220 which is depressed downwardly, similarly to the depression 214 illustrated in FIG. 19. When the front door 130 is closed, a space S is provided between an upper edge of the door mirror base 136 of the front door 130 and a facing lower end of the outer side wall of the roof moulding 174 for enabling the front door 130 to be closed and opened smoothly. Accordingly, in order to enable the upper edge of the door mirror base 136 and the inner seal lip 190 to contact each other, the width of the seal lip 190 as well as the width of the inner side wall 186 is increased downwardly.

And in the border area between the area adapted to contact the movable door glass 134 and the area adapted to contact the door mirror base 136, the widths of both the seal lip 190 and the inner side wall 186 gradually vary to connect adjacent two areas smoothly.

A front edge of the movable door glass 134 moves upwardly along a rear edge of the door mirror base 136, thereby sealing the gap between the movable door glass 134 and the door mirror base 136. Consequently, the border between the movable door glass 134 and the door mirror base 136 is sealed in the area in which the width of the inner seal lip 190 as well as the width of the inner side wall 186 gradually vary.

Therefore, even if the position of the border between the movable door glass 134 and the door mirror base 136 varies due to the assembling error, etc. of the front door 130, the upper edges of the movable door glass 134 and the door mirror base 136 can contact the inner seal lip 190 with good sealing properties.

As described above, the movable door glass 134 of the present embodiment has the depression 220, similarly to that of the depression 214 in the preceding embodiment. Accordingly, by virtue of the depression 220, the present embodiment achieves the same effect as that of the preceding embodiment, and accordingly, the movable door glass 134 can move along the rear edge of the door mirror base 136 securely, and good sealing properties can be ensured by the door mirror weather strip 200 and the door glass weather strip 176 against the movable door glass 134.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure for sealing a vehicle door against a door opening portion of a vehicle body, comprising;
   a movable door glass provided outside a door frame of the vehicle door such that the movable door glass is movable with respect to the door frame;
   a roof moulding provided in the door opening portion of the vehicle body, which extends from a roof of the vehicle body such that the roof moulding is substantially flush with an outer edge of the roof;

a roof weather strip provided within said roof moulding for sealing an upper edge of said movable door glass which is raised to its closed position; and a door glass weather strip attached outside said door frame for sealing an inside face of a peripheral portion of said movable door glass, whereby when said movable door glass is raised to its closed position, said upper edge of said movable door glass is held and sealed within said roof moulding, and said peripheral portion of said movable door glass is sealed with said door glass weather strip, wherein said movable door glass is arranged such that, when the vehicle door is opened, said upper edge of said movable door glass is slightly lowered away from said roof moulding, and while the vehicle door is open, said upper edge is held at said slightly lowered position, and as the vehicle door is closed, said upper edge is slightly raised again and enters said roof moulding.

2. A sealing structure as claimed in claim 1, wherein said roof weather strip has a main body with a U-shaped cross section, which includes side walls, a bottom wall and seal lips which extend from said side walls into an interior of said main body for sealing said upper edge of said movable door glass.

3. A sealing structure as claimed in claim 1, wherein said door glass weather strip is composed of two weather strips which are provided outside said door frame so as to extend in a longitudinal direction thereof in parallel with each other.

4. A sealing structure as claimed in claim 1, wherein said movable door glass has an inwardly depressed part along said upper edge thereof, whereby when the vehicle door is closed and said movable door glass is raised, said depressed part is inserted into said roof moulding, and an outside face of said movable door glass, which is lower than said depressed part, is substantially flush with an outside face of said roof moulding.

5. A sealing structure as claimed in claim 1, wherein said door frame has an upper part corresponding to said upper edge of said movable door glass, and vertical parts extending downwardly from a front end and rear end of said upper part, respectively, at least one of said vertical parts has a guide groove for guiding said movable door glass, said door glass weather strip includes an upper part for sealing said upper part of said door frame, and vertical parts for sealing said vertical parts of said door frame, which are continuously formed with said upper part, said vertical part of said door glass weather strip attached to said vertical part of said door frame, which has said guide groove, is arranged to contact and seal an inside face of said movable door glass along a side edge thereof, and is attached outside said door frame in the position along said side edge of said movable door glass.

6. A sealing structure as claimed in claim 5, wherein said vertical part of said door glass weather strip attached to said vertical part of said door frame, which has said guide groove, is composed of a first vertical door glass weather strip for attachment to said door frame on a rear side of said guide groove, and a second vertical door glass weather strip for attachment to said door frame on a front side of said guide groove.

7. A sealing structure as claimed in claim 5, wherein said guide groove has one of a curved configuration and a generally stepped configuration such that said movable door glass is prevented from interfering with door parts located inside the vehicle door when said movable door glass is raised and lowered.

8. A sealing structure as claimed in claim 5, wherein said guide groove is provided in an outside face of said door frame, and a guide roller is secured to said inside face of said movable door glass, whereby said guide roller moves in said guide groove to raise and lower said movable door glass.

9. A sealing structure as claimed in claim 1, further comprising a fixed door glass which is secured outside said door frame, wherein said roof weather strip provided within said roof moulding seals said upper edge of said movable door glass and a peripheral edge of said fixed door glass, said roof weather strip has such a configuration that when said movable door glass is raised to its closed position, said upper edge of said movable door glass is capable of being seated in an interior of said roof weather strip, and when said vehicle door is closed, said roof weather strip is capable of contacting said peripheral edge of said fixed door glass, and said roof weather strip includes one area in which said upper edge of said movable door glass is to be seated, and another area for contacting said peripheral edge of said fixed door glass, said two areas having different cross-sections from each other.

10. A sealing structure as claimed in claim 9, wherein said roof weather strip has a cross-section which continuously varies from said one area in which said upper edge of said movable door glass is to be seated to said another area for contacting said peripheral edge of said fixed door glass, and said two areas are connected to each other.

11. A sealing structure as claimed in claim 9, wherein said door frame includes an upper part which extends horizontally along said upper edge of said movable door glass, a front vertical part and rear vertical part, each extending downwardly from said upper part, and an intermediate vertical part provided between said movable door glass and said fixed door glass, and said intermediate vertical part has a guide groove for guiding said movable door glass in an outside face thereof.

12. A sealing structure as claimed in claim 9, wherein said vehicle door is a rear door.

* * * * *